United States Patent
Nelson et al.

[11] Patent Number: 6,163,363
[45] Date of Patent: Dec. 19, 2000

[54] PHOTOFINISHING UTILIZING MODULATED LIGHT SOURCE ARRAY

[75] Inventors: William E. Nelson, Dallas, Tex.; Beat Frick, Buchs, Switzerland

[73] Assignees: Texas Instruments Incorporated, Dallas, Tex.; Gretag Imaging AG, Switzerland

[21] Appl. No.: 09/221,517

[22] Filed: Dec. 29, 1998

Related U.S. Application Data

[60] Provisional application No. 60/070,128, Dec. 31, 1997.

[51] Int. Cl.$^7$ ............... G03B 27/32; G03B 27/72; B41J 2/435; B41J 2/47
[52] U.S. Cl. .............. 355/32; 355/35; 347/224; 347/232; 347/239; 347/241
[58] Field of Search .................. 355/18, 35, 40, 355/43, 54, 67, 71, 77; 347/224, 225, 232, 234, 237, 238, 239, 241; 359/237, 263, 298

[56] References Cited

U.S. PATENT DOCUMENTS

| | | | |
|---|---|---|---|
| 4,954,789 | 9/1990 | Sampsell | 359/318 |
| 5,041,851 | 8/1991 | Nelson | 347/134 |
| 5,061,049 | 10/1991 | Hornbeck | 359/224 |
| 5,455,602 | 10/1995 | Tew | 347/239 |
| 5,461,410 | 10/1995 | Venkateswar et al. | 347/240 |
| 5,504,504 | 4/1996 | Markandey et al. | 345/214 |
| 5,539,568 | 7/1996 | Lin et al. | 359/285 |
| 5,583,688 | 12/1996 | Hornbeck | 359/291 |
| 5,585,836 | 12/1996 | Pham et al. | 347/237 |
| 5,630,027 | 5/1997 | Venkateswar et al. | 358/1.8 |
| 5,631,782 | 5/1997 | Smith et al. | 359/871 |
| 5,686,939 | 11/1997 | Millward et al. | 345/148 |
| 5,757,411 | 5/1998 | Florence | 347/245 |
| 5,796,508 | 8/1998 | Suzuki | 359/224 |
| 5,825,400 | 10/1998 | Florence | 347/239 |
| 5,953,103 | 9/1999 | Nakamura | 355/32 |

OTHER PUBLICATIONS

N. Nishida: "Micro machines and optical techniques (2), Digital micromirror devices (DMD) and their applications to displays", *O plus E* (a magazine), Oct. of 1994, No. 179, pp. 90–94.

G.A. Feather "Micromirrors and Digital Processing", May 1995 issue of *Photonics Spectra*, pp. 118–124.

G. Um, D. Foley, A. Szilagyi, J.B. Ji, Y.B. Jeon and Y.K. Kim "Recent Advances in Actuated Mirror Array (AMA) Projector Development", *Asia Display*, 1995, pp. 95–98.

W.E. Nelson and R.L. Bhuva "Digital Micromirror Device Imaging Bar for Hardcopy", *SPIE*, vol. 2413, pp. 58–65.

J.M. Younse "Mirrors on a Chip", Nov. 1993 issue of *IEEE Spectrum*, pp. 27–31.

*Primary Examiner*—Russell Adams
*Assistant Examiner*—Rodney Fuller
*Attorney, Agent, or Firm*—Charles A. Brill; Wade James Brady, III; Frederick J. Telecky, Jr.

[57] ABSTRACT

A digital photograph printer comprising a transport mechanism, a modulated light source (1206), and an exposure controller (1302). The transport mechanism for advancing a photosensitive medium (1202) through an exposure region (1200) such that said photosensitive medium advances one row of pixel locations each row period. The modulated light source (1206) is operable to selectively provide a beam of light to an array of individually modulated regions (1300, 1306, 1310) in an exposure region (1200). As the photosensitive medium (1202) moves through the exposure region (1200) the individually modulated regions in the exposure region (1200) have the opportunity to expose each pixel locations in the exposure region (1200) once each row period. The exposure controller (1302) operable to control the modulated light source (1206) based on image data provided to modulated light source. The image data comprises optical density data for each pixel in an image to be formed on the photosensitive medium for each of at least three primary colors. The controller selectively exposes the photosensitive medium at a number of exposure opportunities, each selective exposure performed for a period no greater than 50% of the row time, and the duration of at least two of the exposure periods having a non-binary relationship.

21 Claims, 15 Drawing Sheets

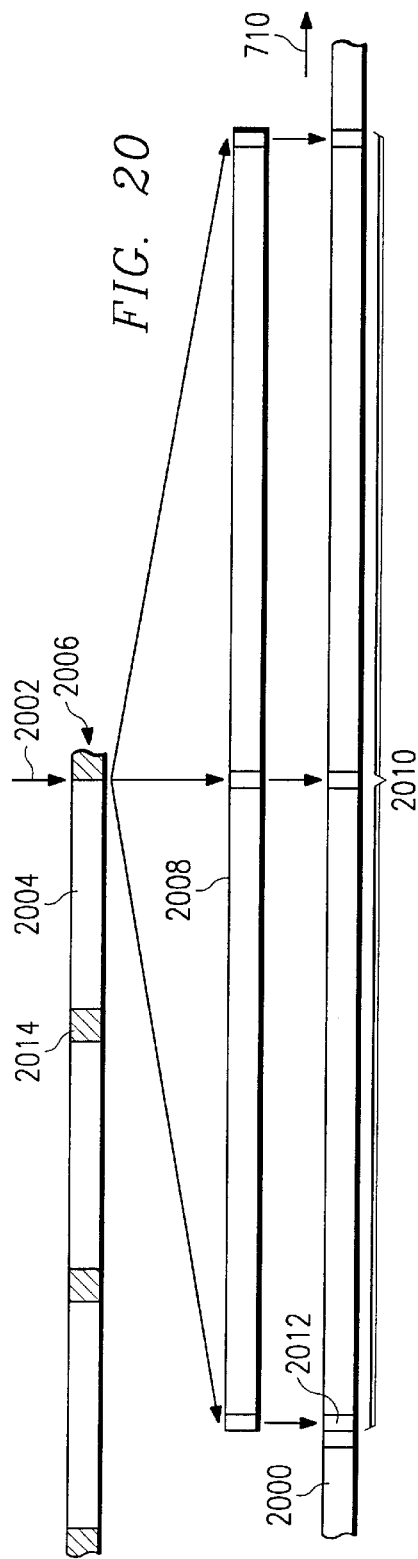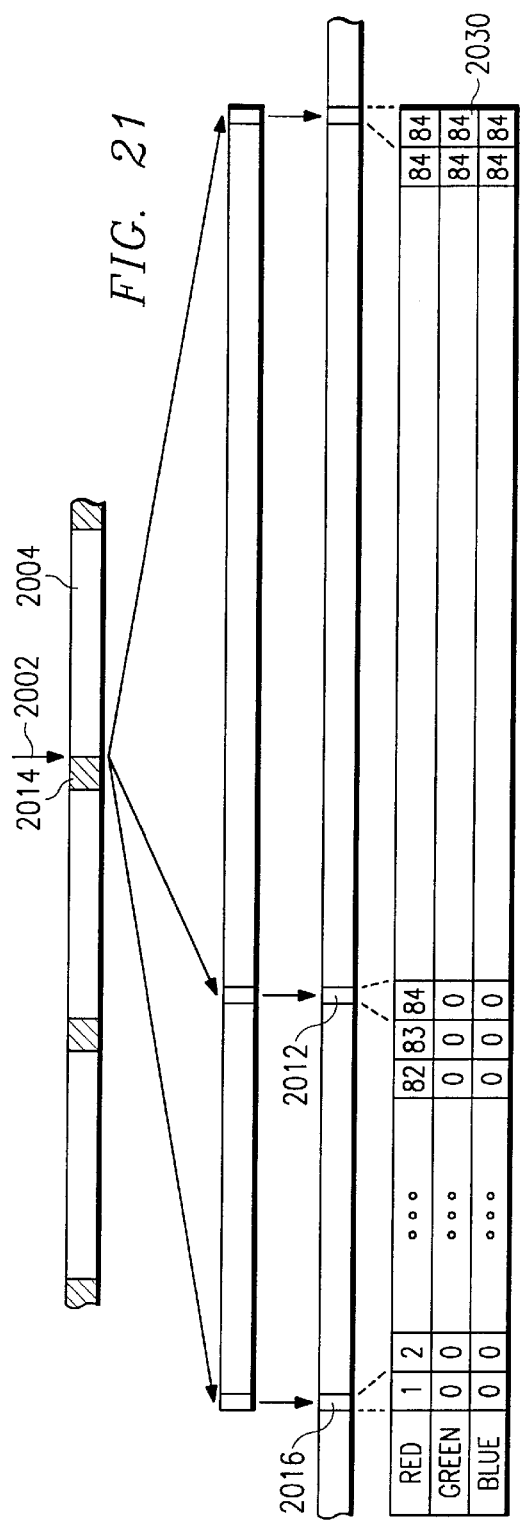

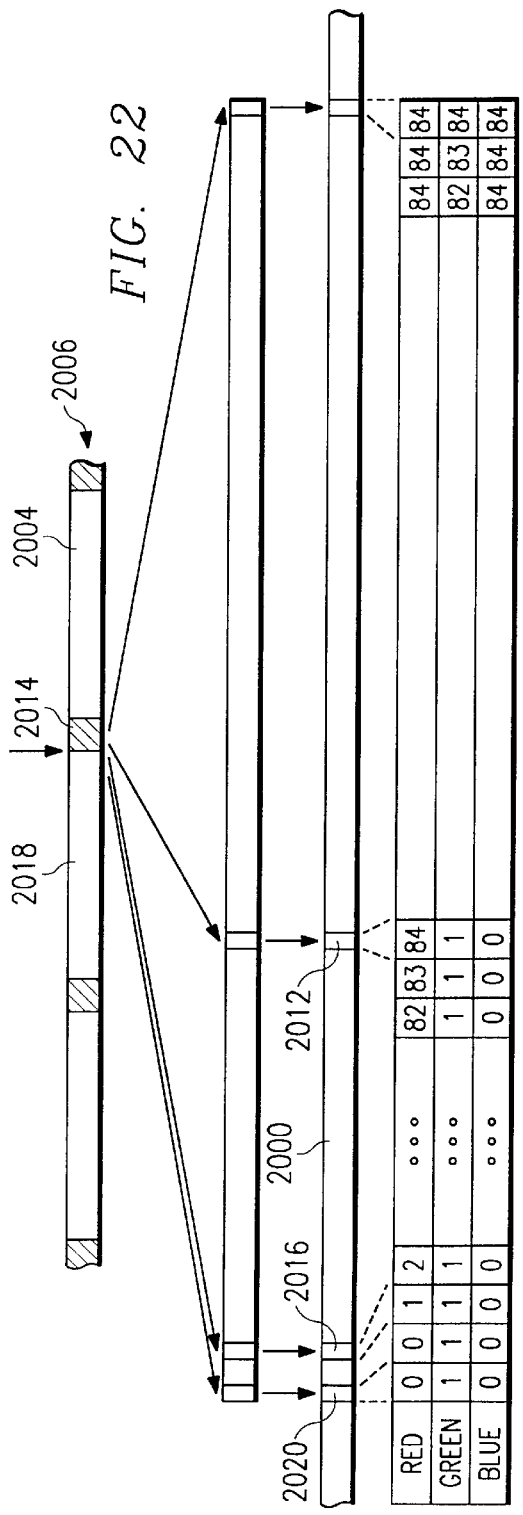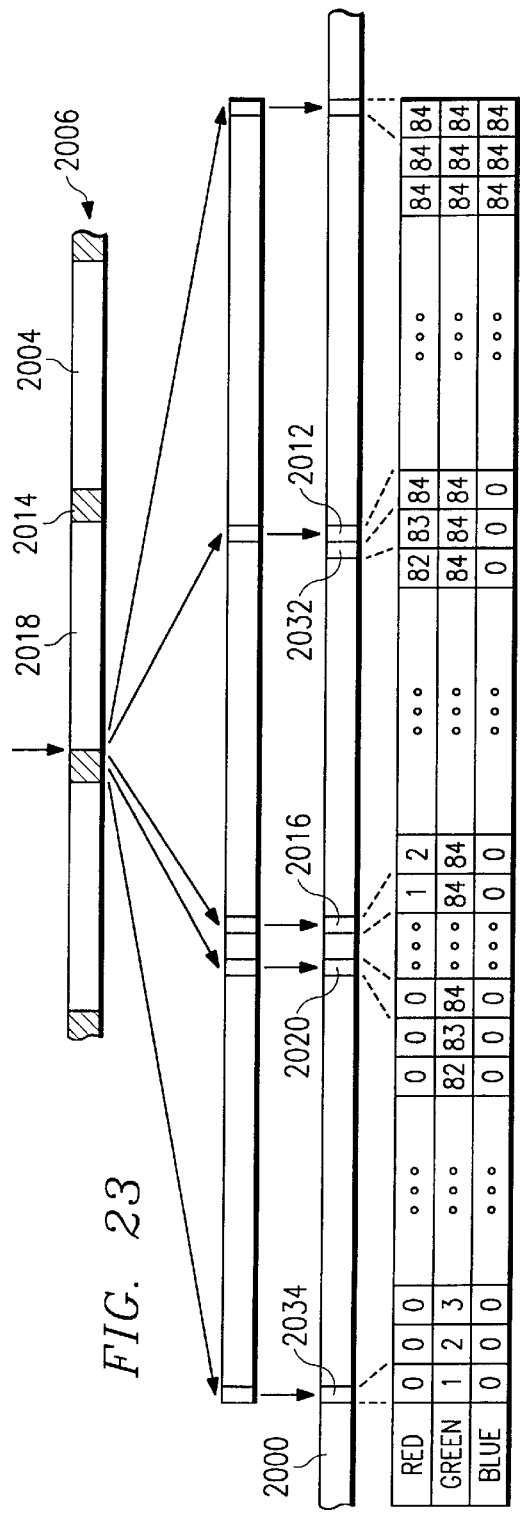

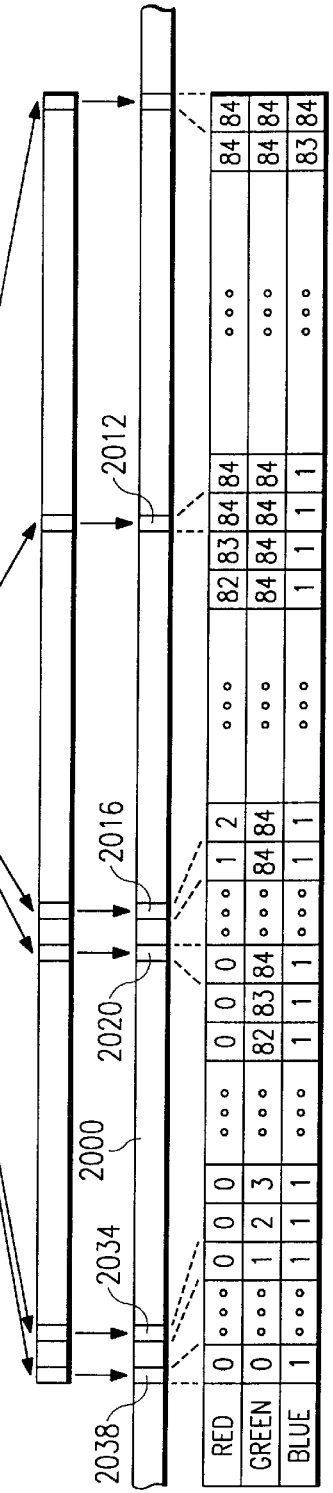
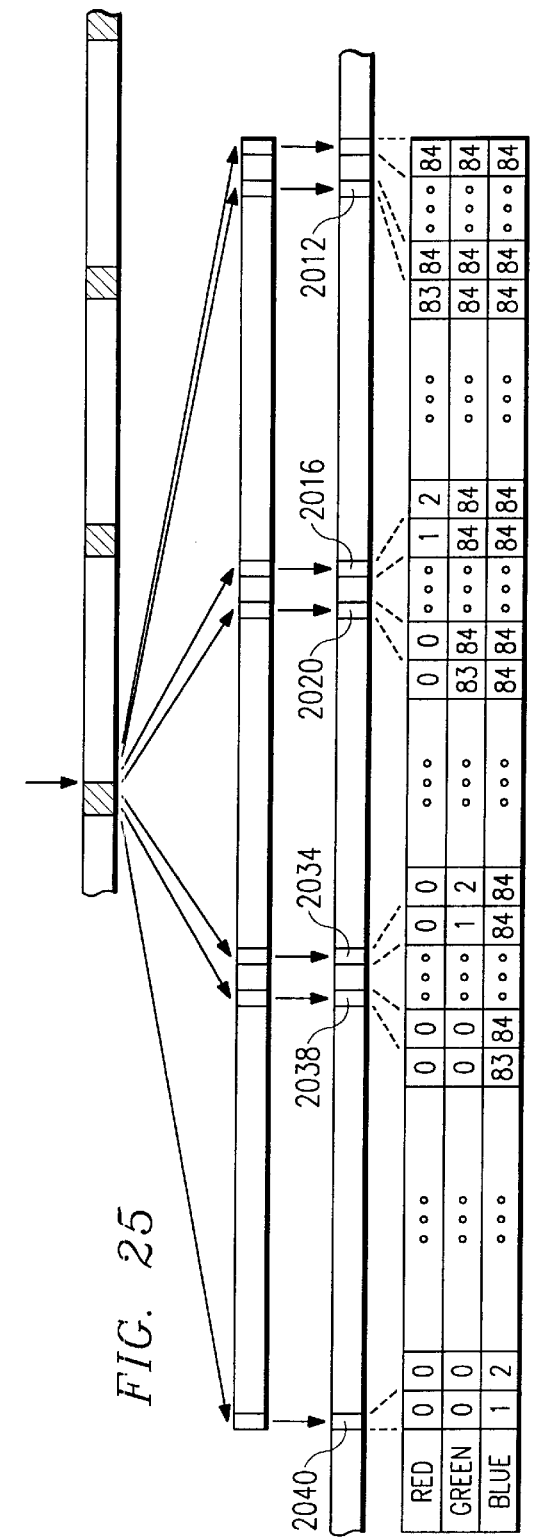
FIG. 24
FIG. 25

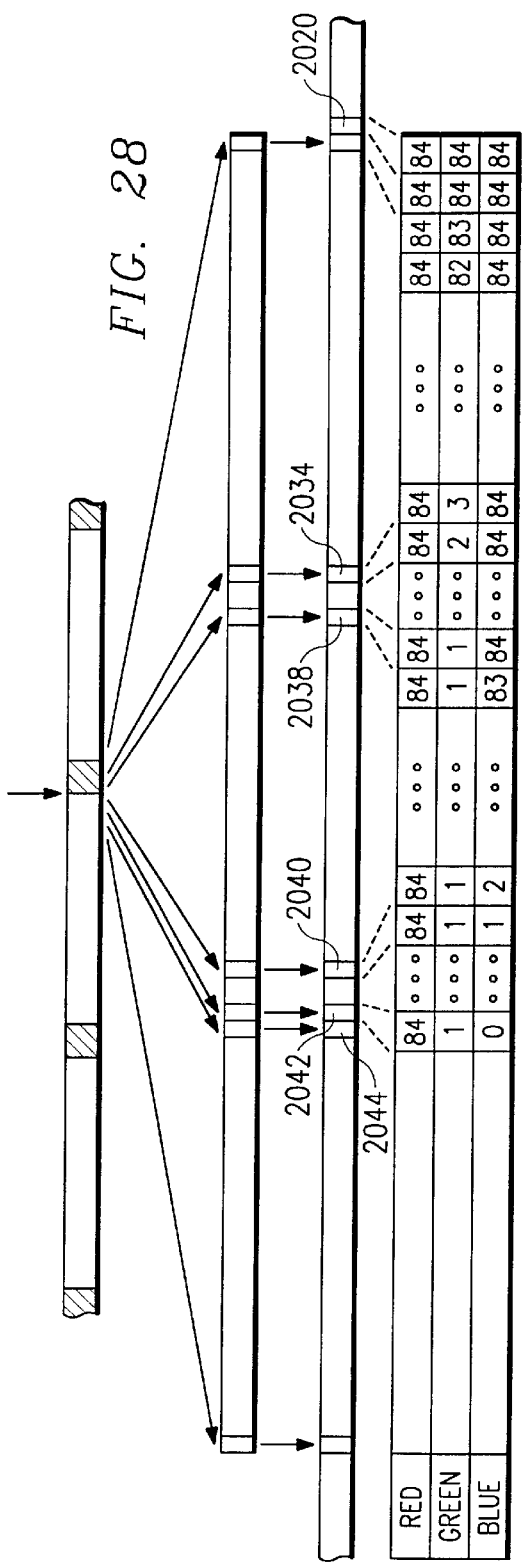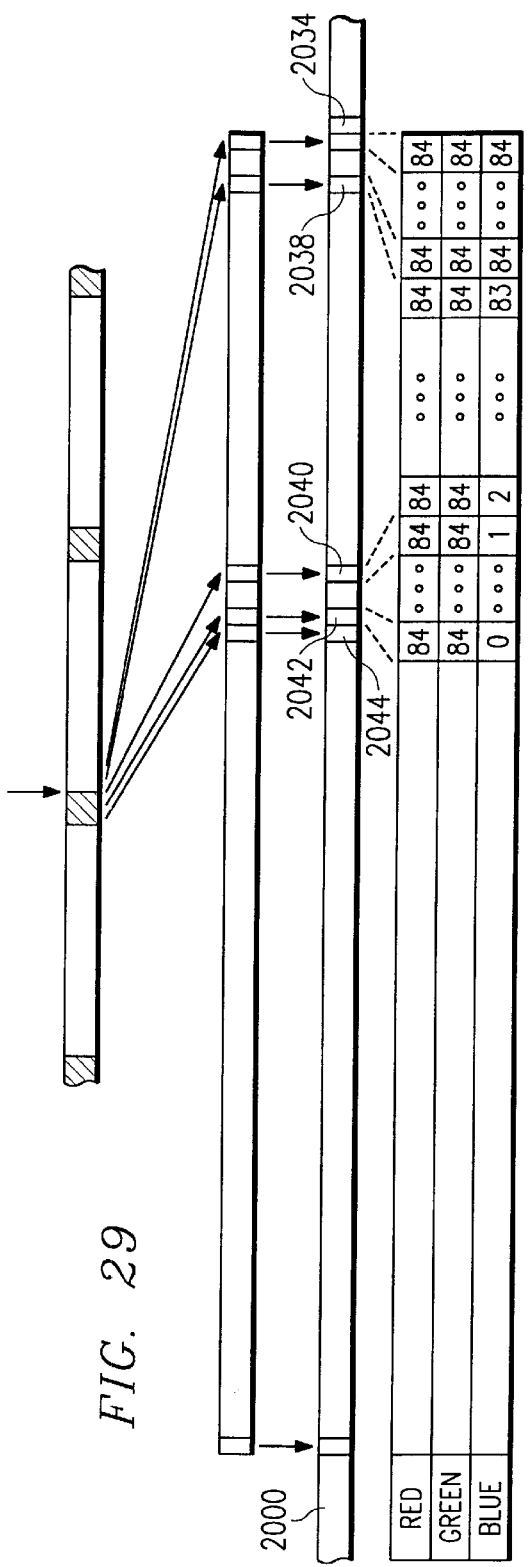

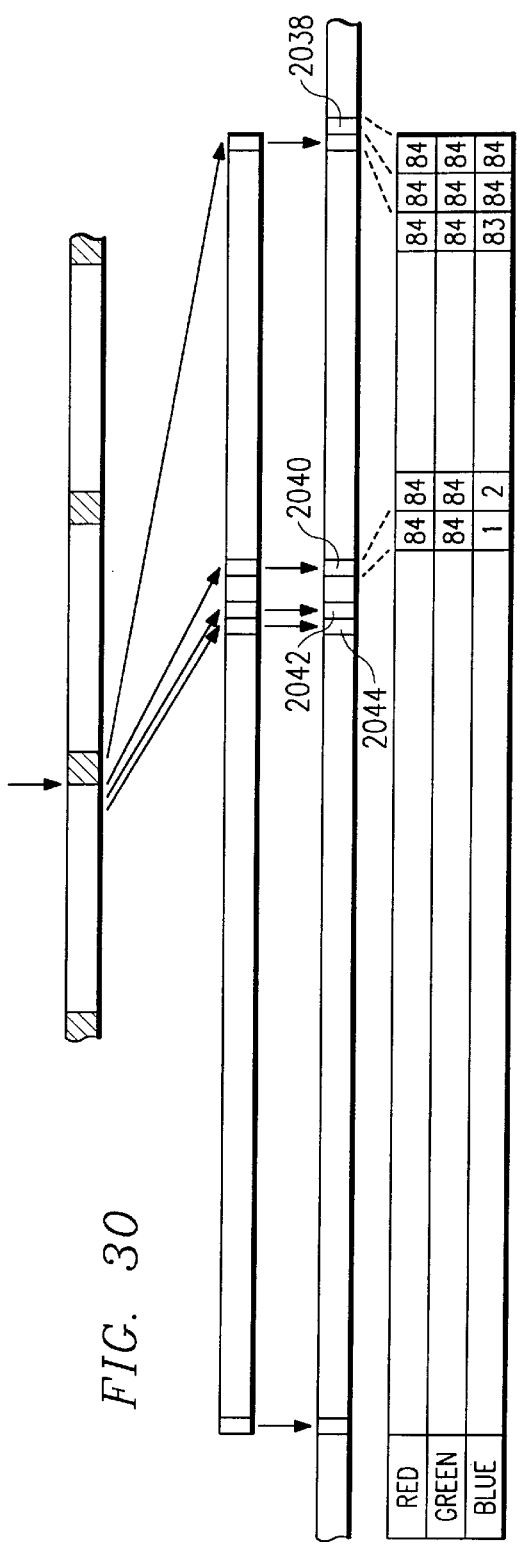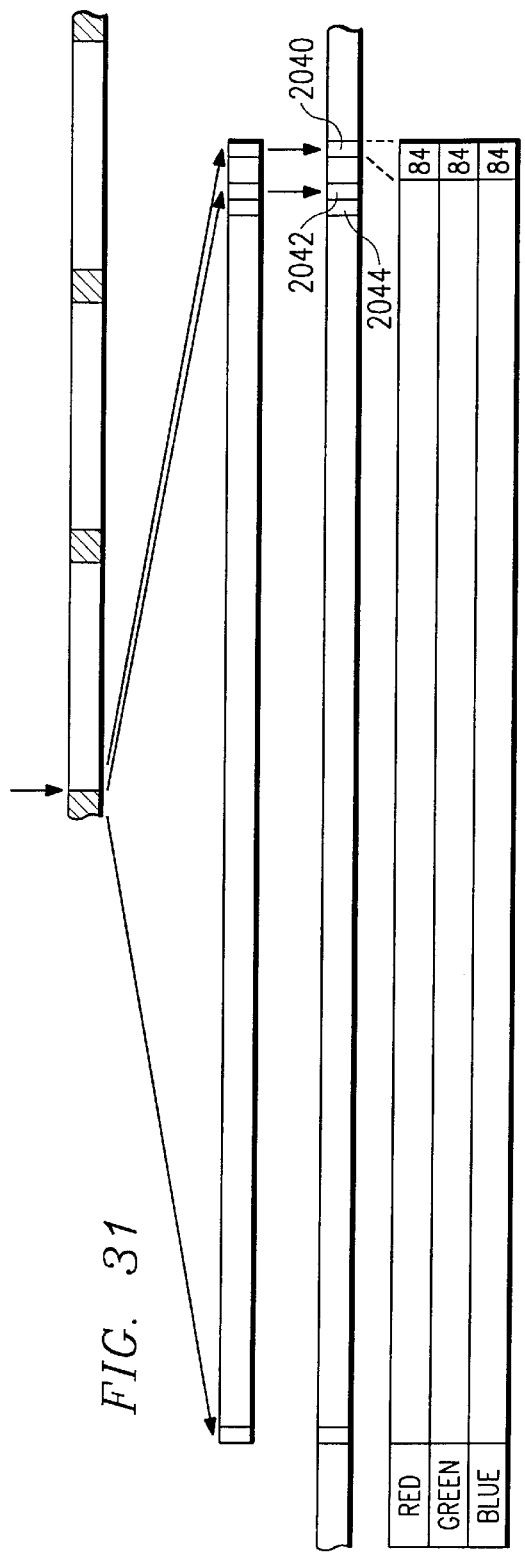

PHOTOFINISHING UTILIZING MODULATED LIGHT SOURCE ARRAY

This application claims priority under 35 USC § 119(e)(1) of provisional application No. 60/070,128 filed Dec. 31, 1997.

CROSS-REFERENCE TO RELATED APPLICATIONS

The following patents and/or commonly assigned patent applications are hereby incorporated herein by reference:

| Patent No. | Filing Date | Issue Date | Title |
| --- | --- | --- | --- |
| 5,061,049 | Sept. 13, 1990 | Oct. 29, 1991 | Spatial Light Modulator and Method |
| 5,455,602 | Mar. 29, 1993 | Oct. 3, 1995 | Combined Modulation Schemes for Spatial Light Modulators |
| 5,461,410 | Mar. 29, 1993 | Oct. 24, 1995 | Gray Scale Printing Using Spatial Light Modulators |
| 5,583,688 | Dec. 21, 1993 | Dec. 10, 1996 | Multi-Level Digital Micromirror Device |
| 5,630,027 | Dec. 28, 1994 | May 13, 1997 | Method and Apparatus for Compensating Horizontal and Vertical Alignment Errors in Display Systems |
| 5,757,411 | June 7, 1995 | May 26, 1998 | Method and Apparatus for Ameliorating the Effects of Misalignment Between Two or More Array of Imaging Elements |
| 5,825,400 | June 7, 1995 | Oct. 20, 1998 | Method and Apparatus for Ameliorating the Effects of Misalignment Between Two or More Array of Imaging Elements |

FIELD OF THE INVENTION

This invention relates to the field of printing systems, more particularly to digital printing systems, yet more particularly to digital photofinishing systems using micromirror light modulators.

BACKGROUND OF THE INVENTION

With the advent of powerful microprocessors and digital signal processors, digital electronics are rapidly finding applications in many traditionally analog, or even non-electronic, fields. One of the primary applications of digital signal processors is in the field of image processing.

Image processing is pervasive in today's motion pictures as well as television broadcasts and computer-based multimedia products. Many software products allow consumers to perform complex image processing in minutes that would have taken months of effort by highly skilled specialists only a few years ago. Using relatively inexpensive equipment, consumers can capture images via a color scanner or digital camera, modify or combine the images, and save the processed image as a computer file or output the image to an inexpensive color printer.

Typical color printers, however, are not capable of reproducing images equivalent with traditional photographic techniques. While color printers, image scanners, and image processing software have become commonplace, photographic quality hardcopy output devices have remained relatively uncommon—and very expensive. As the quantity and quality of digital image source material increases, however, the demand for a photographic-quality hardcopy output device is increasing.

The demand for photographic quality image printers has several sources. First, the advent of digital cameras naturally opens a market for a photographic quality output device to enable consumers to convert the electronic images captured by the digital cameras to traditional photographs.

A second source of demand for photographic quality printers comes from within the traditional photofinishing industry. Traditionally, consumers exposed a roll of film, and delivered the roll to a photofinisher with instructions on the number and size of prints to create of every exposure on the roll. The photofinisher then developed the film, printed the photographs, and returned the photographs along with the developed film to the consumer. Thus, the consumer decides, prior to developing the film or viewing the negatives, how many photographs to purchase regardless of the quality or content of a particular exposure. To obtain additional prints the consumer must return the proper negative to the photofinisher for reprinting. On the average, each negative is used to create about 1.6 photographs. Photofinishers would like to increase this average, which has been fairly stable for several years.

Photofinisher's have recently developed index prints to enable consumers easily to order reprints. Index prints are a single print containing a small image, often called a thumbnail, of each negative in the roll of film. Index prints may be created by digitizing each image, shrinking and combining the digitized images, and printing the single combined image. Index prints make it easier to retrieve particular images from storage and facilitate ordering reprints since the customer can quickly view a single print to determine whether a particular image was photographed on a given roll of film and if so, which exposure must be reprinted.

Another service photofinishers are beginning to provide customers, is an electronic copy of their finished photographs, either on a magnetic floppy disk or an optical CDROM. Electronic copies of the photographs may easily be incorporated into other electronic material. For example, photographs may be inserted in text-based documents or attached to email messages. Furthermore, many photographs may be compiled on a single CDROM, greatly reducing the amount of storage space required to store the photographs. Additionally, CDROMs are relatively durable and endure temperature and humidity extremes that would destroy traditional photographs.

Electronic copies are also used as an intermediate product to facilitate ordering initial prints. Some photofinishers, especially mail-order photofinishers, now develop film and scan each negative. The scanned images are then posted on the Internet or sent as private email to allow the customer to preview the images. The customer then orders a desired number of prints of each image. This method avoids printing images the customer does not want, and allows the customer who desires many copies of an image to proof the image before committing to purchase the copies.

A photographic-quality printer would also improve existing photo-related products. For example, many now send Christmas cards comprised of a family photograph encircled by a decorative border and a seasonal greeting printed on photographic paper. The digital image file containing the photograph, border, and greeting easily could be printed by a digital photographic printer. A similar product is the New Year's Card, which bears a picture of the sender and a seasonal greeting. New Year's cards are quite popular in some parts of the world, with many sending them to each of their friends and business associates. High-speed photographic printers should drive down the cost of producing these Christmas and New Year's cards.

Low-cost versions of the photographic printers also promise to enable new, and much more effective forms of commercial bulk-mail flyers or mailers. Currently, real estate agents often mail postcards bearing the image of houses they have recently sold to homeowners in the same neighborhood in order to generate new listings. Since digitized images can be taken directly from a digital camera to the photographic printer, this form of printing would not involve as much setup labor and could therefore be cheaper than today's offset printing methods. Furthermore, the photographic-quality of the printed image is likely to generate more response from the targeted market.

Unfortunately, available hardcopy photographic-quality output devices cannot output quality images cheap enough and fast enough to exploit these potential markets. What is needed is a photographic-quality hardcopy device capable of producing images at a cost and speed acceptable for the volume photofinishing market (e.g. mailers and cards), and convenient enough for the consumer market, whether the input is electronic or conventional silver halide negatives/positives. The market for printing on silver-halide based paper continues to expand because of the professional feel of the paper and its well known archival qualities.

SUMMARY OF THE INVENTION

Objects and advantages will be obvious, and will in part appear hereinafter and will be accomplished by the present invention which provides a method and system for a photographic-quality output device and a method of printing photographic-quality images. According to one embodiment of the disclosed invention, a method of exposing a full-color pixelated image on a photosensitive medium is provided. The method comprising the steps of providing a photosensitive medium moving through an exposure region, providing a modulated light source, and controlling the modulated light source. The photosensitive medium has an array of pixel locations, and moves through an exposure region one row of pixel locations each row period. The modulated light source is operable to selectively provide a beam of light to an array of individually modulated regions in the exposure region. The individually modulated regions in the exposure region correspond to pixel locations in the exposure region once each exposure opportunity. The number of rows operable in the modulated light source determine a maximum number of exposure opportunities. The controller operates the modulated light source by providing image data to the modulated light source. The image data comprises optical density data for each pixel in an image to be formed on the photosensitive medium for each of at least three primary colors. The controlling step comprises selectively exposing the photosensitive medium at a number of exposure opportunities, the selective exposures performed for a period no greater than 50% of the row time, the duration of at least two of the exposure periods having a non-binary relationship.

According to another embodiment of the present invention, a digital photograph printer is provided. The photograph printer comprises a transport mechanism, a modulated light source, and an exposure controller. The transport mechanism advances a photosensitive medium through an exposure region. The photosensitive medium comprises an array of pixel locations defined thereon. The photosensitive medium moves through the exposure region such that the photosensitive medium advances one row of pixel locations each row period. The modulated light source is operable to selectively provide a beam of light to an array of individually modulated regions in the exposure region. As the photosensitive medium moves through the exposure region, the individually modulated regions in the exposure region correspond to pixel locations in the exposure region once each exposure opportunity. The number of rows operable in the modulated light source determines a maximum number of exposure opportunities. The exposure controller is operable to control the modulated light source based on image data provided to the modulated light source. The image data comprises optical density data for each pixel in an image to be formed on the photosensitive medium for each of at least three primary colors. The controlling step comprises selectively exposing the photosensitive medium at a number of exposure opportunities, wherein the selective exposure is performed for a period no greater than 50% of the row time, and the duration of at least two of the exposure periods have a non-binary relationship.

The optical printer, method of operation, and modulation scheme allow a modulated light source having a very limited number of rows of elements, thus allowing a relatively small modulated light source array to expose an image with a far greater optical density resolution and at a far greater speed that has been possible previously.

BRIEF DESCRIPTION OF THE DRAWINGS

For a more complete understanding of the present invention, and the advantages thereof, reference is now made to the following descriptions taken in conjunction with the accompanying drawings, in which:

FIG. 20 is a schematic view of the optical system of FIG. 17 beginning the exposure of a single column of a photosensitive material as it moves in a process direction FIG. 21 is a schematic view of the exposure process shown in FIG. 20, showing a later exposure than the exposure shown in FIG. 20.

FIG. 22 is a schematic view of the exposure process shown in FIG. 21, showing a later exposure than the exposure shown in FIG. 21.

FIG. 23 is a schematic view of the exposure process shown in FIG. 22, showing a later exposure than the exposure shown in FIG. 22.

FIG. 24 is a schematic view of the exposure process shown in FIG. 23, showing a later exposure than the exposure shown in FIG. 23.

FIG. 25 is a schematic view of the exposure process shown in FIG. 24, showing a later exposure than the exposure shown in FIG. 24.

FIG. 28 is a schematic view of the exposure process shown in FIG. 27, showing a later exposure than the exposure shown in FIG. 27.

FIG. 29 is a schematic view of the exposure process shown in FIG. 28, showing a later exposure than the exposure shown in FIG. 28.

FIG. 30 is a schematic view of the exposure process shown in FIG. 29, showing a later exposure than the exposure shown in FIG. 29.

FIG. 31 is a schematic view of the exposure process shown in FIG. 30, showing a later exposure than the exposure shown in FIG. 30.

DETAILED DESCRIPTION OF THE PREFERRED EMBODIMENTS

Figure 1:
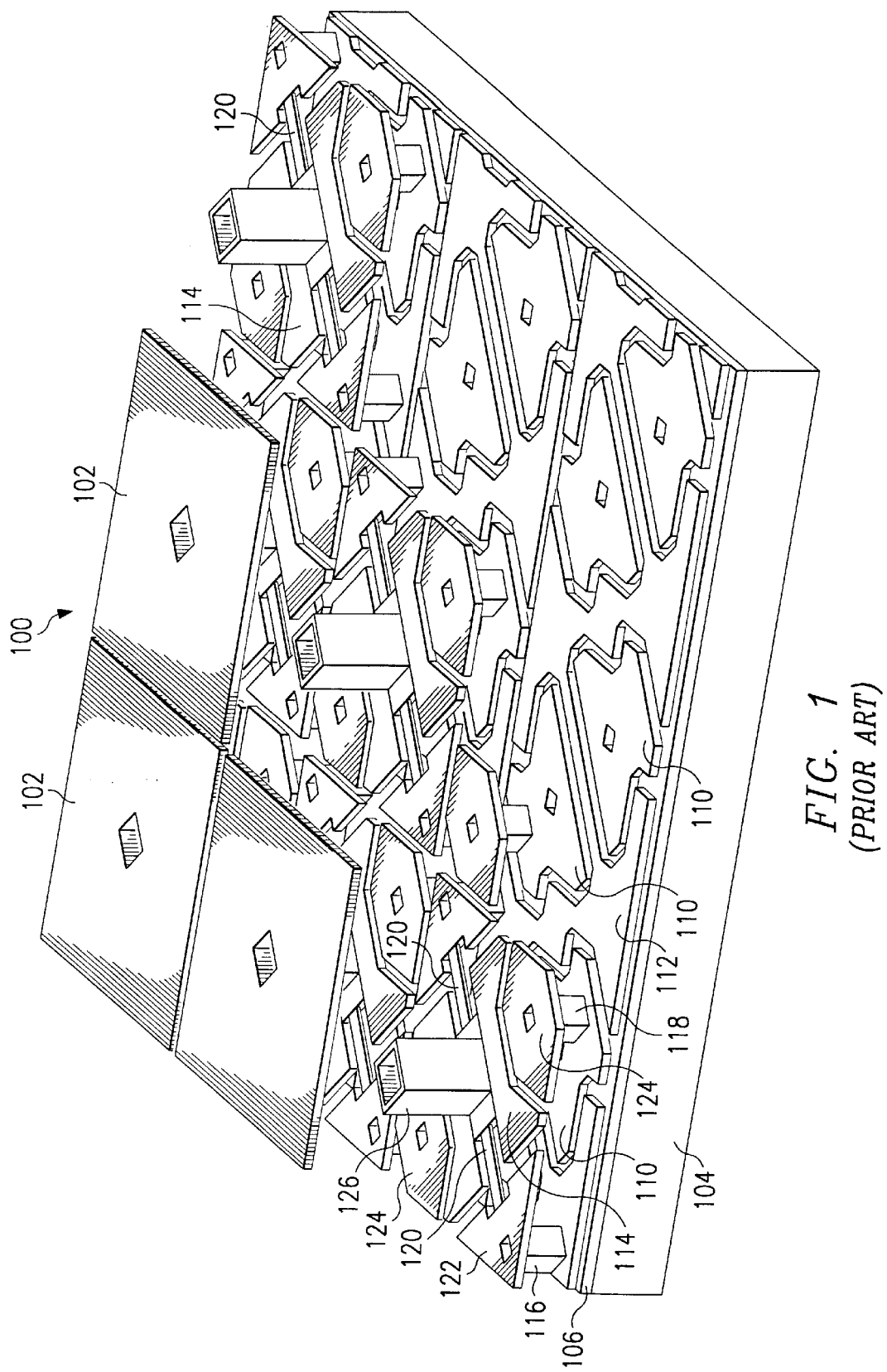
FIG. 1 is a perspective view of a portion of a micromirror array according to the prior art.

A new modulation technique and photographic-quality printer utilizing the same have been developed that enable true digital printing of images on photosensitive paper and other photosensitive materials at process speeds that make the photographic printer ideal for many photo-finishing lab applications.

The disclosed printer and modulation technique are applicable with many types of existing light sources, the discussion of the printer and modulation technique primarily being disclosed in terms of a separate light source and light modulator—specifically a tungsten halogen lamp and a micromechanical digital micromirror device (DMD) modulator. The tungsten lamp is particularly well suited to the spectral response of the photofinishing industry and silver halide print paper.

It should be understood, however, that other types of light modulators, such as liquid crystal devices (LCDs), other light sources, such as light emitting diodes (LEDs) arc lamps, and lasers, or combined modulator/light sources such as LEDs and lasers, are equally applicable to the disclosed printer and modulation technique. Some of these sources can be intensity modulated to provide an additional degree of freedom and modulation depth, while some can only operate as continuous wave (CW) sources.

For the purposes of this disclosure, the term modulated light source array will refer to any light source or combination of light source and modulator that is capable of producing a beam of light with a cross-section having individually modulated regions. The intensity of each individually modulated region, also called a cell or element, determines the optical density of a pixel on the photosensitive medium.

The disclosed printer and modulation technique provide an ideal alternative to traditional photographic-quality printing techniques, especially when combined with modern micromechanical DMDs, and provide a transition into the digital world for photofinishing. DMDs are one class of micromechanical devices which are often used as light modulators. Micromechanical devices are small structures typically fabricated on a semiconductor wafer using techniques such as optical lithography, doping, metal sputtering, oxide deposition, and plasma etching which have been developed for the fabrication of integrated circuits.

Digital micromirror devices have been previously referred to as deformable micromirror devices and are one type of micromechanical device. Other types of micromechanical devices include accelerometers, pressure and flow sensors, gears and motors. While some micromechanical devices, such as pressure sensors, flow sensors, and DMDs have found commercial success, other types have not yet been commercially viable.

Digital micromirror devices are primarily used in optical display systems. In display systems, the DMD is a light modulator that uses digital image data to modulate a beam of light by selectively reflecting portions of the beam of light to a display screen. While analog modes of operation are possible, DMDs typically operate in a digital bistable mode of operation and as such are the core of the first true digital full-color image projection systems.

Micromirrors have evolved rapidly over the past ten to fifteen years. Early devices used a deformable reflective membrane which, when electrostatically attracted to an underlying address electrode, dimpled toward the address electrode. Schlieren optics illuminate the membrane and create an image from the light scattered by the dimpled portions of the membrane. Schlieren systems enabled the membrane devices to form images, but the images formed were very dim and had low contrast ratios, making them unsuitable for most image display applications.

Later micromirror devices used flaps or diving board-shaped cantilever beams of silicon or aluminum, coupled with dark-field optics to create images having improved contrast ratios. Flap and cantilever beam devices typically used a single metal layer to form the top reflective layer of the device. This single metal layer tended to deform over a large region, however, which scattered light impinging on the deformed portion. Torsion beam devices use a thin metal layer to form a torsion beam, which is referred to as a hinge, and a thicker metal layer to form a rigid member, or beam, typically having a mirror-like surface: concentrating the deformation on a relatively small portion of the DMD surface. The rigid mirror remains flat while the hinges deform, minimizing the amount of light scattered by the device and improving the contrast ratio of the device.

Recent micromirror configurations, called hidden-hinge designs, further improve the image contrast ratio by fabricating the mirror on a pedestal above the torsion beams. The elevated mirror covers the torsion beams, torsion beam supports, and a rigid yoke connecting the torsion beams and mirror support, further improving the contrast ratio of images produced by the device. Contrast ratios of several hundred to one are now readily achieved. High contrast ratios are critically important to photofinishing applications, and modern hidden-hinge DMD designs provide a higher contrast ratio than other spatial light modulators.

Figure 2:
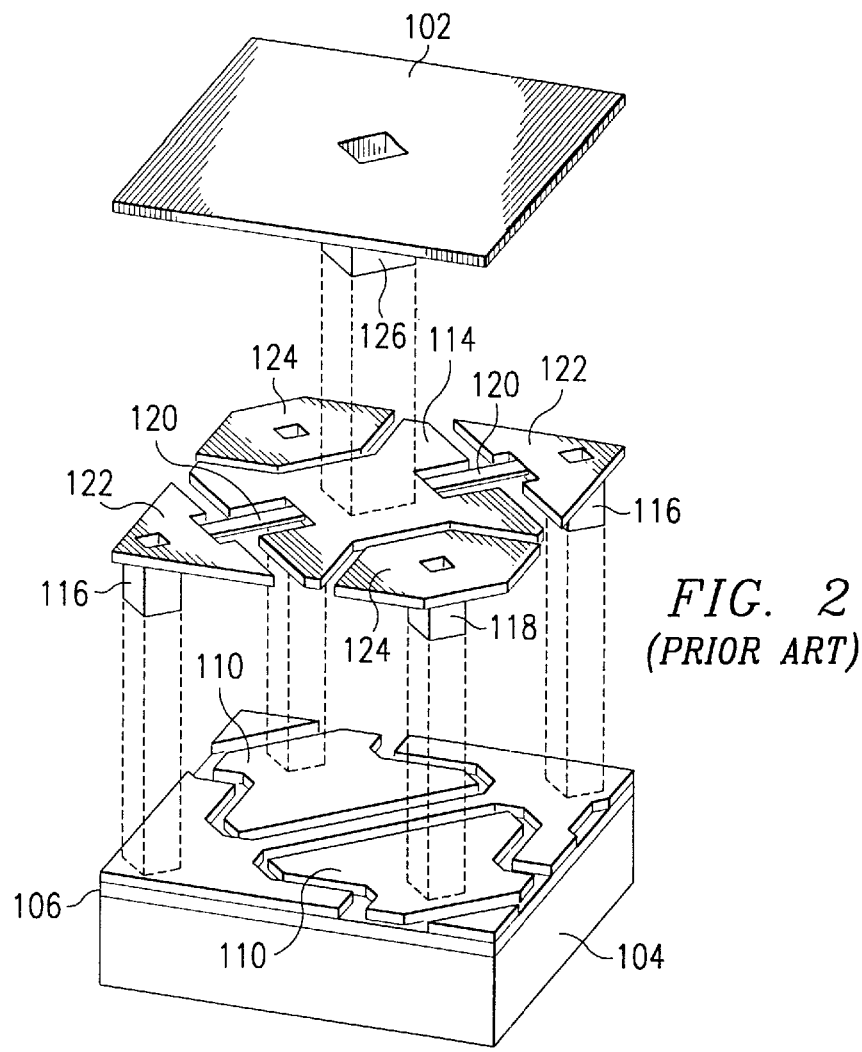
FIG. 2 is an exploded view of one element, or cell, of the micromirror array of FIG. 1.

A typical hidden-hinge DMD 100 is actually an orthogonal array of DMD cells, or elements. This array often includes more than a thousand DMD rows and columns of DMDs. FIG. 1 shows a small portion of a DMD array with several mirrors 102 removed to show the underlying mechanical structure of the DMD array. FIG. 2 is an exploded view of a single DMD element further detailing the relationships between the DMD structures.

A DMD is fabricated on a semiconductor, typically silicon, substrate 104. Electrical control circuitry is typically fabricated in or on the surface of the semiconductor substrate 104 using standard integrated circuit process flows. This circuitry typically includes, but is not limited to, a memory cell associated with and typically underlying each mirror 102 and digital logic circuits to control the transfer of the digital image data to the underlying memory cells. Voltage driver circuits to drive bias and reset signals to the mirror superstructure may also be fabricated on the DMD structure, or may be external to the DMD. Image processing and formatting logic is also formed in the substrate 104 of some designs.

Older DMD configurations used a split reset configuration which allows several DMD elements to share one memory cell—thus reducing the number of memory cells necessary to operate a very large array, and making more room available for voltage driver and image processing circuitry on the DMD integrated circuit. For the purposes of this disclosure, addressing circuitry is considered to include any circuitry, including direct voltage connections and shared memory cells, used to control the direction of rotation of a DMD mirror. Split reset is enabled by the bistable operation of a DMD, which allows the contents of the underlying memory to change without affecting the position of the mirror 102 when the mirror has a bias voltage applied. Newer generations of DMDs, however, have evolved totally to non-split reset architectures which use one memory cell for each DMD element.

The silicon substrate 104 and any necessary metal interconnection layers are isolated from the DMD superstructure by an insulating layer 106 which is typically a deposited silicon dioxide layer on which the DMD superstructure is formed after the silicon dioxide layer is planarized and polished to a high degree of flatness. Holes or vias 108 are opened in the oxide layer to allow electrical connection of the DMD superstructure with the electronic circuitry formed in the substrate 104.

The first layer of the superstructure is a metalization layer, typically the third metalization layer, often called M3. Two metalization layers, often called M1 and M2, are typically required to interconnect the circuitry fabricated on the substrate. This metalization layer is deposited on the insulating layer and patterned to form address electrodes 110 and a mirror bias connection 112. Some micromirror designs have landing electrodes which are separate and distinct structures but are electrical connects to the mirror bias connection 112. Landing electrodes limit the rotation of the mirror 102 and prevent the rotated mirror 102 or hinge yoke 114 from touching the address electrodes 110, which have a voltage potential relative to the mirror 102. If the mirror 102 contacted the address electrodes 110, the resulting short circuit could fuse the torsion hinges 116 or weld the mirror 102 to the address electrodes 110, in either case ruining the DMD. Since the same voltage is always applied to both the landing electrodes and the mirrors 102, the mirror bias connection and the landing electrodes are preferably combined in a single structure when possible. The mirror bias connection 112 typically includes regions called landing sites which mechanically limit the rotation of the mirror 102 or a hinge yoke 114. These landing sites are often coated with a material chosen to reduce the tendency of the mirror 102 and torsion hinge yoke 144 to stick to the landing site.

Mirror bias/reset voltages travel to each mirror 102 through a combination paths using both the mirror bias/reset metalization 112 and mirrors and torsion beams of adjacent mirror elements. Split reset designs require the array of mirrors to be subdivided into multiple subarrays each having an independent mirror bias connection. The landing electrode/mirror bias 112 configuration shown in FIG. 1 is ideally suited to split reset applications since the DMD elements are easily segregated into electrically isolated rows or columns simply by isolating the mirror bias/reset layer between the subarrays.

A first layer of supports, typically called spacervias, is fabricated on the metal layer forming the address electrodes 110 and mirror bias connections 112. These spacervias, which include both hinge support spacervias 116 and upper address electrode spacervias 118, are typically formed by spinning a thin spacer layer over the address electrodes 110 and mirror bias connections 112. This thin spacer layer is typically a 1 µm thick layer of positive photoresist. After the photoresist layer is deposited, it is exposed, patterned, and deep UV hardened to form holes where the spacervias will be formed. This spacer layer, as well as a thicker spacer layer used later in the fabrication process, are often called sacrificial layers since they are used only as forms during the fabrication process and are removed from the device prior to device operation.

A thin layer of metal is sputtered onto the spacer layer and into the holes. An oxide is then deposited over the thin metal layer and patterned to form an etch mask over the regions that later will form hinges 120. A thicker layer of metal, typically an aluminum alloy, is sputtered over the thin layer and oxide etch masks. Another layer of oxide is deposited and patterned to define the hinge yoke 114, hinge cap 122, and the upper address electrodes 124. After this second oxide layer is patterned, the two metal layers are etched simultaneously and the oxide etch stops removed to leave thick rigid hinge yokes 114, hinge caps 122, and upper address electrodes 124, and thin flexible torsion beams 120.

A thick spacer layer is then deposited over the thick metal layer and patterned to define holes in which mirror support spacervias 126 will be formed. The thick spacer layer is typically a 2 µm thick layer of positive photoresist. A layer of mirror metal, typically an aluminum alloy, is sputtered on the surface of the thick spacer layer and into the holes in the thick spacer layer. This metal layer is then patterned to form the mirrors 102 and both spacer layers are removed using a plasma etch.

Once the two spacer layers have been removed, the mirror is free to rotate about the axis formed by the torsion hinge. Electrostatic attraction between an address electrode 110 and a deflectable rigid member, which in effect form the two plates of an air gap capacitor, is used to rotate the mirror structure. Depending on the design of the micromirror device, the rigid member is the torsion beam yoke 114, beam, mirror 102, both the yoke 114 and beam or mirror 102, or a beam attached directly to the torsion beams. The upper address electrodes 124 also electrostatically attract the rigid member.

The force created by the voltage potential is a function of the reciprocal of the distance between the two plates. As the rigid member rotates due to the electrostatic torque, the torsion beam hinges resist with a restoring torque which is an approximately linear function of the angular deflection of the torsion beams. The structure rotates until the restoring torsion beam torque equals the electrostatic torque, or until the rotation is mechanically stopped by contact between the rotating structure and a stationary portion of the DMD—typically at a rotation of 10° to 12° in either direction. As mentioned above, most micromirror devices are operated in a digital mode wherein sufficiently large bias voltages are used to ensure full deflection of the micromirror superstructure.

Micromirror devices are generally operated in one of two modes of operation. The first mode of operation is an analog mode, sometimes called beam steering, wherein the address electrode is charged to a voltage corresponding to the desired deflection of the mirror. Light striking the micromirror device is reflected by the mirror at an angle determined by the deflection of the mirror. Depending on the voltage applied to the address electrode, the cone of light reflected by an individual mirror is directed to fall outside the aperture of a projection lens, partially within the aperture, or completely within the aperture of the lens. The reflected light is focused by the lens onto an image plane, with each individual mirror corresponding to a location on the image plane. As the cone of reflected light is moved from completely within the aperture to completely outside the aperture, the image location corresponding to the mirror dims, creating continuous brightness levels.

The second mode of operation is a digital mode. When operated digitally, each micromirror is fully deflected in either of the two directions about the torsion beam axis. Digital operation uses a well defined bias voltage to ensure the mirror is fully deflected. Since it is advantageous to drive the address electrode using standard logic voltage levels, a bias voltage, typically a negative voltage, is applied to the mirror metal layer to increase the voltage difference between the address electrodes and the mirrors after addressing the mirrors with a lower, CMOS compatible voltage, typically +5 V. Use of a sufficiently large mirror bias voltage, a voltage above what is termed the collapse voltage of the device, ensures the mirror will deflect to the closest landing electrodes even in the absence of an address voltage. Therefore, by using a large mirror bias voltage, the address voltages need only be large enough to deflect the mirror slightly, and predetermine the deflection direction, e.g. establish the mirror cell as an "off-state" or an "on-state."

To create an image using the micromirror device, the light source is positioned at an angle equal to twice the angle of rotation so that mirrors rotated toward the light source reflect light in a direction normal to the surface of the micromirror device and into the aperture of a projection lens—creating a bright pixel on the image plane. Mirrors rotated away from the light source reflect light away from the projection lens—leaving the corresponding pixel dark.

Figure 3:
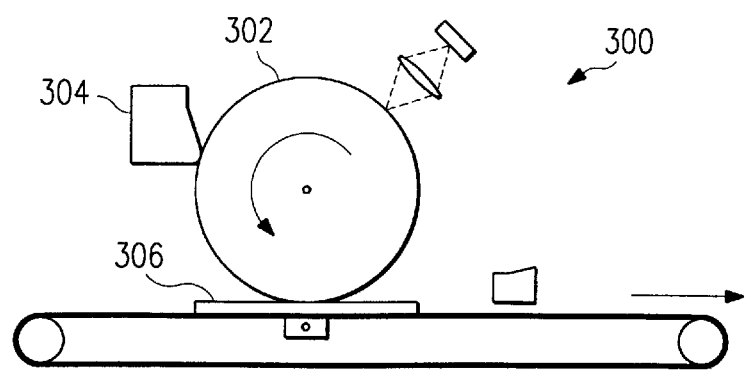
FIG. 3 is a schematic view of a xerographic printer showing the exposure of a photosensitive medium to light.

Printed images are created by focusing the modulated light on a photosensitive surface to form a latent image, and later developing the latent image. For example, a xerographic printer 300, as shown in FIG. 3, projects an image on a photoreceptor 302. The photoreceptor 302 is an electrostatically charged cylinder having an insulating photosensitive coating applied to it. When exposed to light, portions of the photosensitive surface become conductive and discharge the static charge applied to the exposed portions, forming a latent image represented by the remaining charge distribution. The photoreceptor drum 302 rotates past a toner developer system 304 where toner particles are attracted to the imaged portions of the drum 302 that retain an appropriate charge. The toner is later transferred to an electrically charged sheet of paper 306 where it is melted, or fused, to form an image on the paper.

Figure 4:
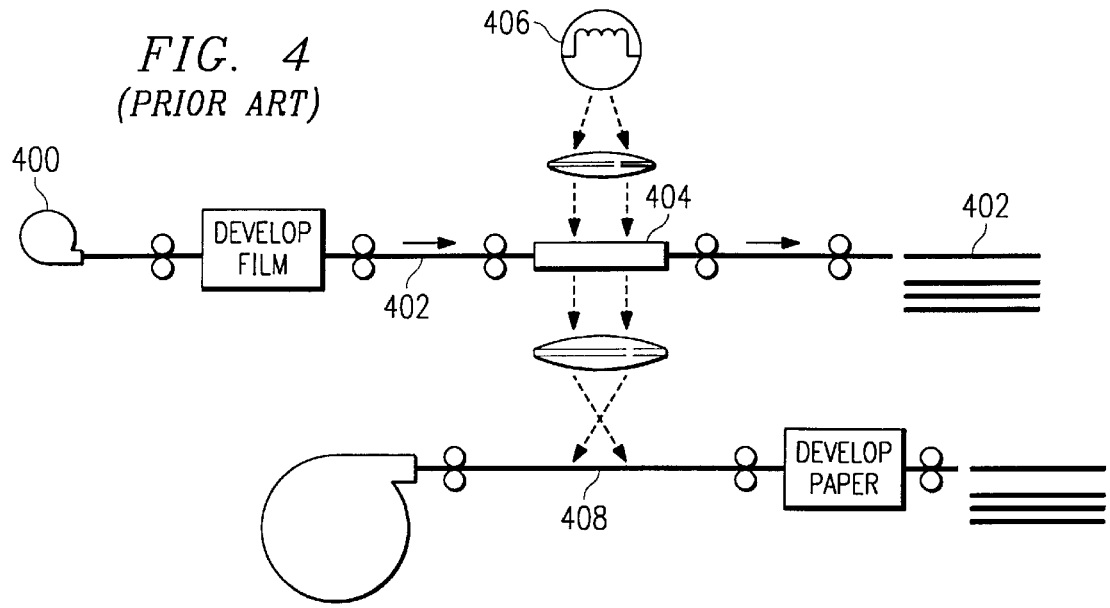
FIG. 4 is a schematic representation of conventional photographic negative develop and print apparatus.

Traditional photofinishing processes, shown in FIG. 4, develop exposed film 400 to form a series of negatives 402. A transport mechanism moves each negative, one at a time, to a stage 404 where it is held while being illuminated by light from source 406. The light passing through the negative is analog modulated in three successive color bands, and the resulting imaging are focused on a suitably sized piece of photographic paper 408. After a period of time sufficient to expose the photographic paper 408 in each color, the light is shut off and both the negative film strip and the photographic paper are advanced to allow the next section of paper to be exposed. The exposed paper is developed, cut into separate prints, and returned along with the negatives to the customer.

Many years of development have been invested in the photographic process. The result of this effort is an array of modem photographic films, papers, and development processes which together allow amateur photographers to create relatively inexpensive, very high resolution contone color images. On the other hand, digital photographic printers thus far have been unable to provide photographic-quality images at a competitive price.

Producers of digital photofinishing equipment have had a difficult time designing equipment capable of producing the high-resolution images necessary to compete with traditional analog photographic processes. Even specifying a minimum required resolution for photographic printers is difficult. Photographic film comprises many small photosensitive molecules (silver halide grains) uniformly distributed on the film. The grains are a precise mixture of sizes specifically chosen to provide certain characteristics at the expense of other characteristics. For example, large grains tend to be better adapted to low-light exposures, or conversely high-speed exposures, but have a noticeably lower-resolution than films using a smaller grain size.

Digital sources, on the other hand, produce an ordered array of uniformly-sized picture elements, or pixels, which can easily be specified in terms of dots per inch (dpi). Each pixel, which is a dot having a uniform color and uniform intensity, represents the smallest region of an image that can be individually controlled. These pixels, while only two or three mils in size, are hundreds of times the size of the film or paper silver halide grains.

Due to the characteristics of human visual perception, the minimum resolution a digital photographic printer must provide to produce prints with a perceived image quality equivalent to traditional photographic processes is linked to; (1) the number of intensity levels available for each pixel, (2) the dots per inch of the digital exposure process, and (3) the viewing distance and the viewing conditions (e.g. illumination). Printers with a large number of intensity levels can produce acceptable prints with a lower resolution modulator than can a printer with a lower number of intensity levels. In particular, for pure photographic scenes (without text or graphics) resolutions of 160 to 200 dots per inch (dpi) can result in very pleasing photographic images when the number of gray levels per color can approach 10 bits (2048 levels) per color.

Experimentation has shown that a digital photographic printer must provide images with a resolution of at least 320 dpi and 4096 unique intensity levels for each of the three component colors to be accepted as a viable alternative to traditional photographic processes when images contain text, graphics, and/or computer generated content. Providing 4096 intensity levels requires a minimum 12-bit intensity word for each color.

In addition to providing an image having at least 320 dpi with 12-bits of resolution, a digital photographic printer must be able to rapidly produce a large number of prints in order to gain acceptance in the photofinishing market. Specifically, the photographic printer should be capable of producing 2,000, and up to 20,000 4×6 inch prints in one hour, to have wide commercial acceptance, and in order to produce prints at very competitive price. With the exception of the DMD, most digital light modulators and spatial light modulators (SLMs) cannot simultaneously give high speed, high resolution, and high bits per pixel (gray scale)—the data bandwidth requirement is enormous.

Figure 5:
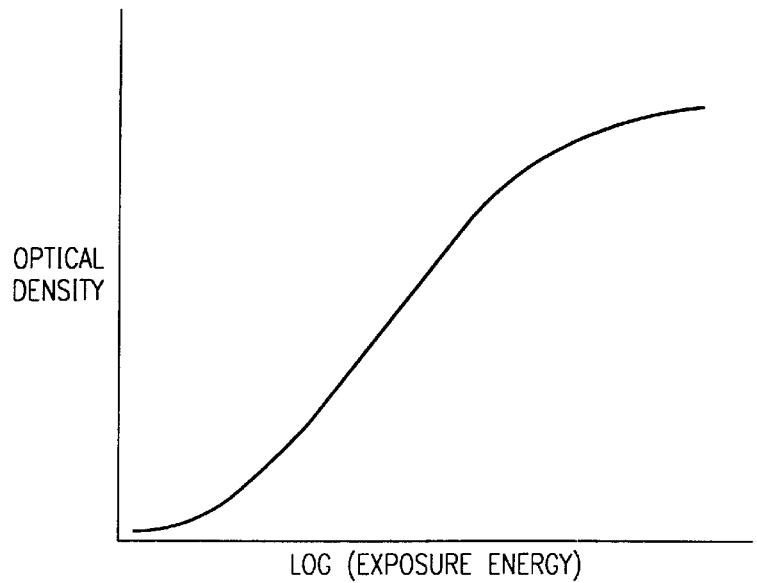
FIG. 5 is a typical response curve for photographic media.
Figure 6:
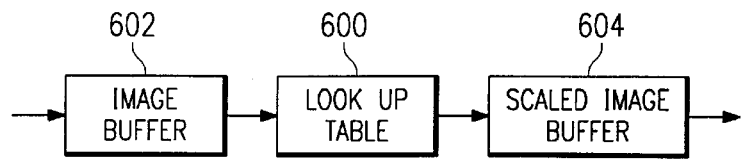
FIG. 6 is a block diagram of a portion of an image processing system showing image scaling by the use of a lookup table.

While each type of paper has a specific response, a typical photographic paper response is shown in FIG. 5. Most papers have basically similar response curves. To compensate for the non-linear response shown in FIG. 5 (referred to as a D log E curve), binary image data is scaled prior to being used by the photographic printer. This is necessary because the density (D) resulting on the finished print is a logarithmic function of the exposing light energy (log E). While many methods of scaling the image data are available, a lookup table 600, shown in FIG. 6, is ideally suited to perform the necessary scaling. The input data, typically held in an input buffer 602, is used as an address to access a location in the lookup table 600. The data stored at the accessed location represents the scaled data and is output as a data word, typically to another image buffer 604.

Combining both the 4×6 inch print size and the 320 dpi spatial resolution specification requires a 1280×1920 modulator array if the entire photograph is to be imaged at one time. Unfortunately, a 1280×1920 modulator array is impractical to operate and prohibitively costly. One solution, shown in FIG. 7, uses a lamp 702 to illuminate a reduced portion of a suitably wide modulator array 704, specifically an array having a width of at least 1280 elements, to image a narrow exposure region 706 across the width of the photosensitive material 708. If a large display type modulator array is used, the modulator elements outside of the narrow portion used to image the photosensitive material 708 are turned off so that the light reaching them is not transmitted to the imaging lens 710 or the paper 708. Modulated light reaching the imaging lens 710 is focused onto the paper after being reflected by suitable folding optics 712. The paper 708 is moved past the exposure region 706 to allow the entire length of the image to be exposed continuously, effectively allowing an unrestricted exposure length in the process (paper motion) direction.

Figure 7:
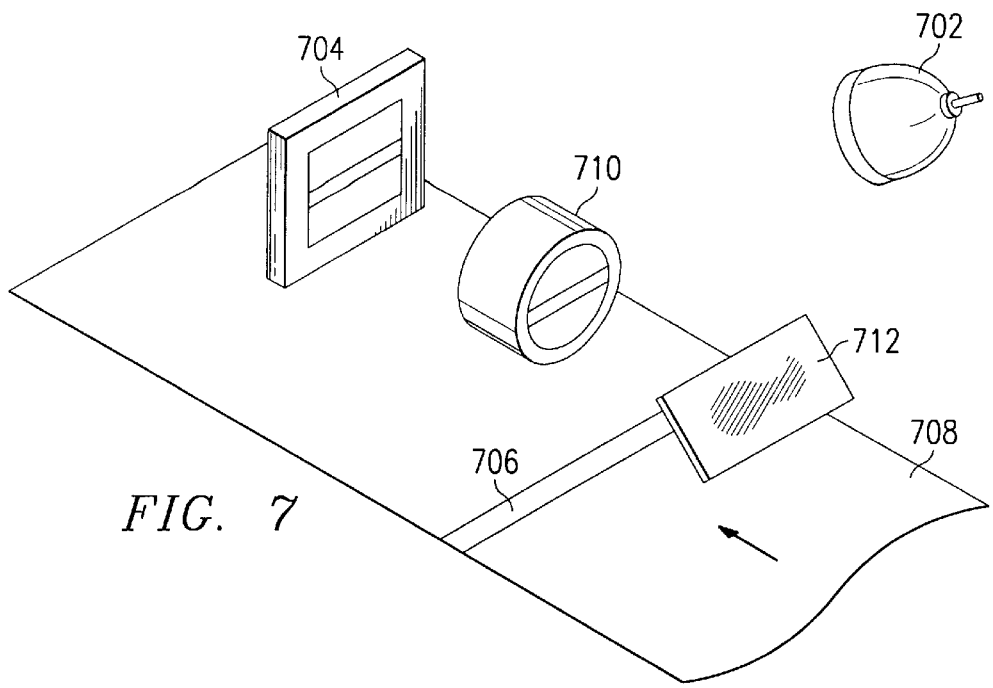
FIG. 7 is a perspective view of the major optical components in an optical printer for imaging a continuously moving photosensitive medium.

FIG. 7 is shown merely for purposes of illustration and not for purposes of limitation. There are many alternative embodiments available to expose the paper. For example, a transmissive modulator or controllable light source is sometimes used in place of the reflective modulator shown. Additionally, alternative embodiments have additional lenses or alternative light paths, or alternative spatial light modulator arrays, and can be reflective or transmissive.

The paper 708 in FIG. 7 may be moved either by stepping the paper 708, typically in increments (1) the length of one line of exposure, (2) by the entire width of the exposing region, or (3) by continuously moving the paper across the exposure region 706 and synchronizing the operation of the modulator array 704 with the movement of the paper 708. Continuous movement of the paper across the exposure region is preferred to eliminate banding or stepping motion artifacts.

Given the requirement the printer must be able to produce several thousand 4×6 inch photographs each hour, and assuming the photographs are printed on a four inch wide roll of photographic paper or four inch wide sheets, the paper must be exposed at a linear rate of several inches per second. A very useful embodiment printing 4800 4×6 prints per hour implies a paper process speed of 8" per second. Process speeds would vary depending on the number of prints per hour and the resolution in dots per inch.

Given a resolution of 320 lines per inch and a paper speed of 8 inches per second, the printer must expose 2560 lines each second—corresponding to a maximum of only 391 $\mu$S to expose each line. The time needed to filly expose the paper depends on the light source 702 as well as the type of paper 708 used. Given a nominal 150 W Tungsten-Halogen light source at 3200° K and a standard photographic paper, a saturated exposure requires approximately 3 to 5 mS of total exposure time. Clearly more than one DMD line time is required to achieve a fully saturated exposure. In addition, a reduction in exposure duty-cycle (from 100% of a line time) is desired to reduce line broadening or "smearing" due to the continuously moving paper substrate. Typically 25% of a line time gives a sharp exposed image. This suggests 40 to 60 equivalent DMD rows of exposure would be needed for a suitable exposure process.

Figure 8:
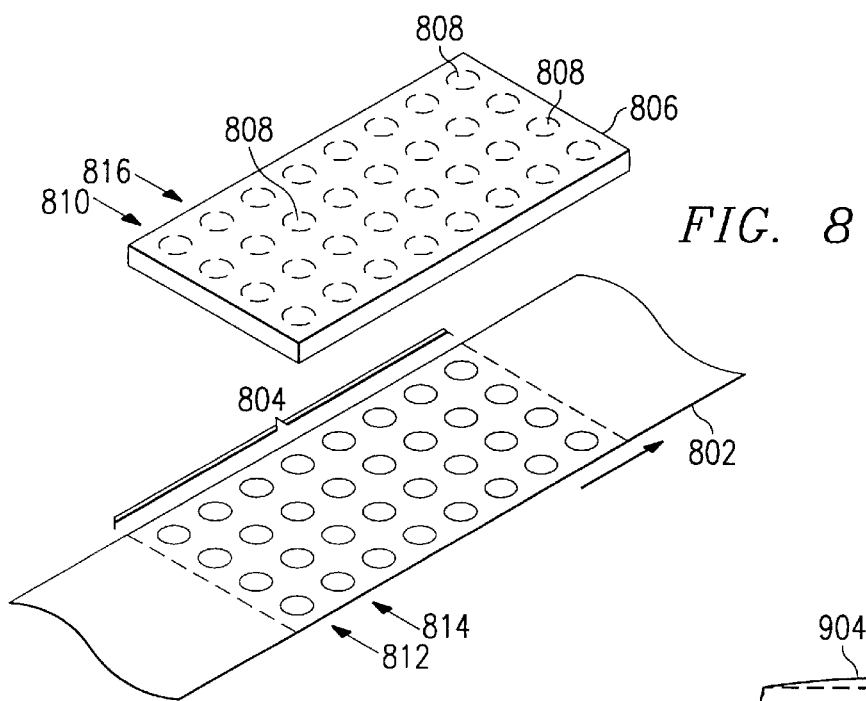
FIG. 8 is a simplified example of a section of photosensitive material as it passes through an exposure region created by a modulated light source.

Time Integration Gray scale (TIG), also known as Time Delay and Integrate (TDI), as discussed by U.S. Pat. No. 5,455,602, is the typical modulation scheme for a DMD-based xerographic printer. TIG exposes the surface of a photosensitive material as it moves past an exposure region created by the image of a modulated light source. FIG. 8 shows a simplified example of a section of photosensitive material 802 (shown as a flat surface) as it passes through an exposure region 804 created by a modulated light source 806. The modulated light source 806 shown in FIG. 8 is an array of LED elements 808. In FIG. 8, the outline of each LED element 808 is shown from the backside of the LED array. Also shown in FIG. 8 is the outline of each pixel in the exposure region 804 on the photosensitive material or exposed substrate 802.

As a location on the photosensitive material reaches the beginning of the exposure region 804 it is exposed by a pulse of light from one of the LED elements 808 in the first row 810 of the modulated light source 806. Due to the speed of the photosensitive material, the location only receives a short exposure from the first row 810 of the modulated light source 806 while it is in the first row of the exposure region 812.

After being exposed by the first row of the modulated light source 806, the partially exposed portion of the photosensitive material advances to the second exposure location 814 where, assuming the image data for the pixel requires further exposure, the pixel is further exposed by the second row 816 of the modulated light source 806. As the region of the photosensitive material exposed by the first row 812 of the modulated light source 806 is now exposed by the second row 816 of the modulated light source 806, the next region of the photosensitive material is exposed by the first row 812 of elements 808. This process continues as the photosensitive material 802 advances through the entire exposure region 804 allowing all of the rows of the modulated light source 806 to expose the photosensitive material 802. Pixels whose image data dictates an intermediate exposure are only exposed by some of the rows of the modulated light source 806.

Each exposure of a given image pixel by an element 808 of the modulated light source 806 is equivalent to one least significant bit (LSB) of the image data word for that pixel. Therefore, an N-row modulated light source is capable of exposing the photosensitive material with $\log_2(N)$ binary gray scale levels. Achieving 12-bits of gray scale with TIG modulation requires 4096 rows of modulator elements—far too many rows to be practicable using modulators available today—in this TIG scheme.

A second modulation scheme, generally used in DMD-based display devices, is Pulse Width Modulation (PWM). PWM varies the duty cycle of a modulated light source array element proportionally with the data word assigned to a pixel. Unfortunately, given a minimum LSB period of 17 $\mu$S (equal to the minimum cycle time of a DMD mirror), exposing a pixel with 12-bits of image data takes 69.6 mS per row—far longer than the 0.391 mS available while maintaining the required system throughput of 4800 4×6 prints per hour.

To allow PWM to be used in printing systems while maintaining an acceptable throughput, two modulation schemes were developed. These schemes, taught in commonly-owned U.S. Pat. No. 5,455,602, entitled "Combined Modulation Schemes for Spatial Light Modulators" and issued Oct. 3, 1995, and U.S. Pat. No. 5,461,410, entitled "Gray Scale Printing Using Spatial Light Modulators" and issued Oct. 24, 1995, utilize multiple rows of modulated light source elements to expose an image fully.

According to one modulation scheme, multiple rows of elements are used, each providing several bits of PWM exposure. According to the other scheme, multiple rows of modulator elements are used, with one row providing a multiple-bit PWM exposure and the remaining rows providing a TIG exposure.

Prior art modulation techniques cannot simultaneously meet both the throughput and quality requirements of the photographic-quality printing system. Prior art pulse width modulation techniques with their long exposure times are too slow, and existing time integration gray scale techniques require too many modulator array rows.

It is preferable to minimize the number of modulator array rows necessary to create an image. Although each additional row of modulator elements potentially provides an additional exposure opportunity, and therefore the opportunity to increase the depth, or resolution, of each pixel, each additional row also drives up the cost of the modulator array and optics, and makes it more difficult to bring the image of the modulator array into sharp focus on the photosensitive material.

The cost of the device rises as the size of the modulator array increases. Not only does a larger modulator array require additional materials to fabricate, increasing the number of modulator elements in the array increases the risk of the modulator containing non-functioning modulator elements which could ruin the entire device.

Figure 9:
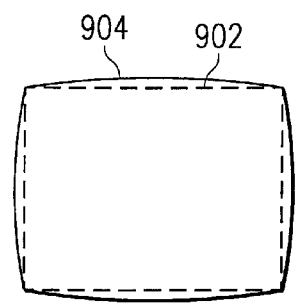
FIG. 9 is a illustration of the distortion that occurs when an image is focused onto a surface.

Larger arrays also make it more difficult to focus the image of the array onto the photographic medium. FIG. 9 illustrates the difficulty experienced when focusing a large modulator array. In FIG. 9, the desired outline of the perfectly magnified, undistorted modulator array 902 is represented by a hidden line and the outline of the real-life focused image 904 is represented by a solid line. The two outlines have been scaled to the same size, and it is assumed that no anamorphic optical elements have been used. As seen in FIG. 9, the focused image 904 tends to bulge outward around all four sides, or conversely "pin cushion" in, depending on the unavoidable distortion characteristics of the imager lens.

Figures 10, 11:
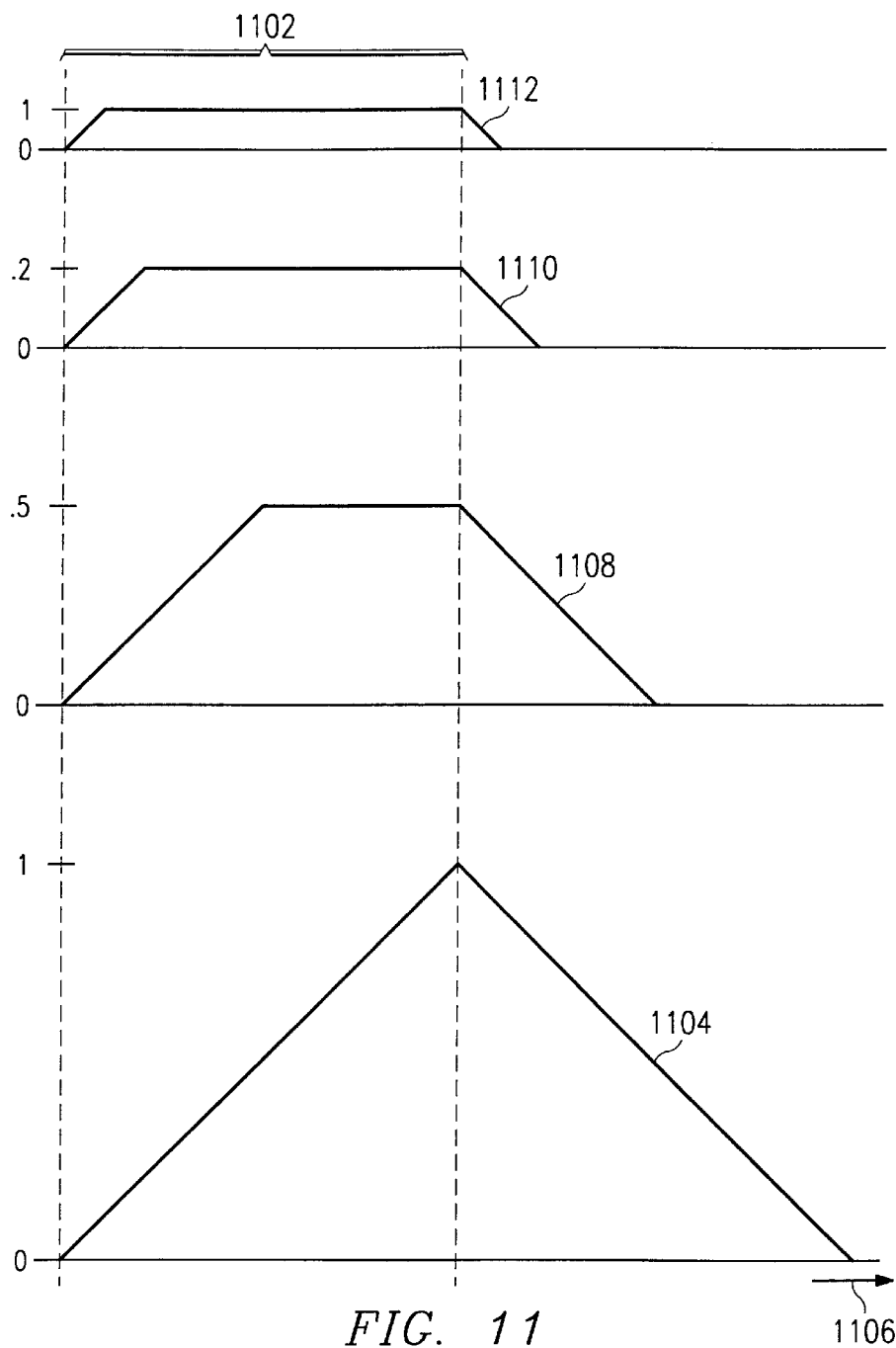
FIG. 10 is an exaggerated view of the misalignment that occurs, due to the distortion shown in FIG. 9, when various portions of an array are used to image the same region of a moving surface.
FIG. 11 illustrates the interaction between exposure period and paper movement in a continuous motion photographic printer system

The bulging shown in FIG. 9 is mitigated by using more complex optical systems with added cost and manufacturing tolerances, but never fully eliminated. While the bulging generally is not a problem for image display systems, the bulging causes alignment problems for systems which accumulate exposures from multiple rows to form a single pixel. FIG. 10 greatly exaggerates the effects of image bulging to illustrate the alignment problems created by the bulging. A simple, but very effective method of reducing distortion is to utilize a smaller field of view at the object—not filling the imager lens to the maximum of four corners. Imaging an object with a long, narrow aspect ratio reduces the effects of imager distortion in the corners of the image field.

FIG. 10, shows three exposures formed by different rows of the modulator array 902 outlined in FIG. 9. The three exposures are superimposed just as they would be after a section of the photosensitive material passed underneath all three of the modulator rows and received an exposure from each row. The outline of the exposure created by a modulator row from the center of the modulator array 1002 is shown by a solid line in FIG. 10. The outline of the exposure created by the top row of the modulator array 1004 is shown by long dashes, while the outline of the exposure created by the bottom row of the modulator array 1006 is shown by short dashes.

As shown in FIG. 10, the exposure from the center of the array shows very little distortion. The exposures from the top 1004 and bottom 1006 of the modulator array, however, are clearly distorted with the center of the line image bent outward. Although the distortion shown in FIG. 10 is greatly exaggerated, as would be the case for a low quality lens, any misalignment between the images from different portions of the light modulator array will reduce the effective spatial resolution of the image and result in fuzzy, unacceptable images. This problem is at its worst when a very large array is logically divided into three distinct segments, each segment for exposing the photosensitive material with a unique color of light. Since each exposure color will assume one of the three different shapes shown in FIG. 10, the three color components of each pixel will not be accurately superimposed in the final image and the image quality will be low.

Adjusting the timing of the exposures in the photographic printer compensates for some types of misregistration and distortion. To compensate for variations in the paper transport motion, the timing circuitry retards the exposure by a fraction of a row time, the time it takes faster moving paper to move from the exposure region of a first row to the exposure region of a second row, and advances the exposure by a similar fraction of a row time when the paper transport is moving more slowly. Adjusting the row timing alignment cannot completely eliminate the effects of the optical distortion of FIGS. 9 and 10, however, but it can distribute or average the misalignment across the entire row, thereby mitigating the visual effect of the distortion. Ideally one chooses to use as few rows of the DMD light modulator as possible, thereby minimizing the height of the imaged area of the device and simultaneously minimizing the distortion shown in FIG. 9.

Prior art modulation techniques that do not require a very large number of modulator rows require long row exposure times relative to the line time. Long row exposure times do not produce sharply focused lines or pixels on the photosensitive material, but instead tend to blur the pixels in the process direction. FIG. 11 illustrates the interaction between exposure period and paper movement in a continuous motion photographic printer system.

The width of one exposure line is shown as the distance 1102 between the dashed lines of FIG. 1. For the purposes of FIG. 11, it is assumed that exposure energy is evenly distributed across the entire line width. The exposure profiles shown in FIG. 11 are the integral of the exposure energy received across a section of the moving photosensitive material when the exposure time is a given percentage of the line time.

Exposure profile 1104 shows the widening that occurs when the exposure time is equal to the line time—when the paper is exposed for 100% of the entire time it moves from one line position to the next. The line represented by exposure profile 1104 is twice the width of a single exposure line since the paper moved an entire line width during the exposure. Only the center of the line represented by exposure profile 1104 receives a peak exposure, and both the leading and trailing edges of the line, relative to the process direction 1106, are both broadened and have a ramped exposure characteristic that creates a smeared or blurred appearance. For each exposure profile in FIG. 11, the peak exposure is normalized to the full exposure profile 1104.

The blurring depicted by FIG. 11 is avoided by using a stepper mechanism to advance the photosensitive material between exposure periods while allowing the photosensitive material to remain motionless during each exposure. The cost of providing a stepper mechanism capable of meeting the system throughput requirements while maintaining proper registration between rows is prohibitive and continuous motion mechanisms are preferred.

Exposure profile 1108 shows the reduced blurring that occurs when the exposure period is only one-half of the line period. A duty cycle of one-half of the line period reduces the peak exposure and the line widening by fifty percent, and also makes the exposure much more uniform since one-third of the effective line width receives the peak exposure. Likewise, a twenty percent duty cycle and a ten percent duty cycle provide even more uniform exposures and sharper line images, but at the cost of a reduced peak exposure level.

Based on the image quality requirements of photographic printers, the exposure period is optimum in terms of sharpness and exposure around a maximum of twenty-five percent of the line period. A twenty-five percent duty cycle, coupled with a 150 watt light source, provides sharp line exposures with adequate exposure energy at the desired process speeds. Existing PWM techniques require longer exposure periods than are practical.

A new modulation technique has been developed that greatly reduces the number of modulators rows required to provide a large number of discrete exposure levels. This new modulation technique enables light modulators, and discrete light sources such as light emitting diodes, to expose photosensitive material including photographic paper and xerographic printing systems incorporating photoreceptors.

The new modulation scheme will be taught herein by way of a limited number of examples. It should be understood, however, that the techniques discussed herein are applicable to a vast number of unique embodiments and are not limited to the embodiments specifically discussed. While a few of the alternate embodiments will be discussed below, the potential number of alternate embodiments is virtually endless. Over 4000 possible solutions using this modulation process have been calculated and tabulated.

The new modulation technique uses multiple rows of elements in a modulated light source, or a spatial light modulator with any suitable source of illumination, to build up, or accumulate, an exposure at a location on a photosensitive material passing through an exposure region created by the image of the modulated light source or SLM. As each line of exposure on the photosensitive material passes through the exposure region, it may receive one exposure from each row of the modulated light source. Unlike PWM techniques for displays, in which each row of the modulated light source provides an exposure period for each bit of a binary image data word, according to the disclosed invention each row provides a single exposure period to the location. Unlike TIG modulation schemes, the present modulation technique varies the exposure contributed by at least some rows of the modulator array. Not only does the contribution of some rows of elements to the total exposure vary, the contribution of each row need not have a binary relationship from one row to the next.

By way of example, and not by limitation, according to one embodiment of the disclosed invention eighty-four exposure periods for one color field are used to expose the media. Each exposure period has a duration greater than the minimum cycle time of the exposure source used. The minimum cycle time of a DMD is the minimum time in which a mirror element may be deflected and reset—typically about 17 $\mu$S. The minimum cycle time of an LED is the minimum time required to turn the diode on and off.

The eighty-four exposure periods, which combine to make one color exposure phase, all have one of only four durations. For example, the four exposure durations of this embodiment are 10, 11, 18, and 56 times the minimum device cycle time. One of the eighty-four exposure periods is ten times the minimum device cycle time, five of the exposure periods are eleven times the minimum device cycle time, four of the exposure periods are eighteen times the minimum device cycle time, and seventy-four of the exposure periods are fifty-six times the minimum device cycle time. These exposure relationships are summarized in Table 1. Exposure durations such as those provided in Table 1 need not be in terms of the minimum device cycle time. The minimum increment possible using combinations of the exposure durations will be referred to as an LSB period.

TABLE 1

| Exposure Type | Number of Exposures | Exposure Duration | Total Duration |
| --- | --- | --- | --- |
| 1 | 1 | 10 | 10 |
| 2 | 5 | 11 | 55 |
| 3 | 4 | 18 | 72 |
| 4 | 74 | 56 | 4144 |
| Total | 84 | | 4281 |

The exposure periods listed in Table 1 allow eighty-four exposures to produce a latent image having over 12 bits of information content: in fact the total number of exposure levels achievable is 4281. Traditional TIG exposure techniques require 4,096 rows to produce 12 bits of gray scale information. Traditional PWM exposure techniques require long exposure durations which, as discussed above, unacceptably widen, or blur, the exposed dot on the moving media.

An algorithm is used to select this type of pulse width solution matrix. The algorithm determines combinations of exposures that can be provided by the "number of exposures," which translates to the number of SLM or LED rows required. The various combinations must be able to span the entire range from minimum exposure to maximum exposure (in the example of Table 1 from 10 to 4281) without gaps. In practice, a few low-level exposures, typically exposure values of 50 and less, cannot be achieved, but careful selection of the exposure period ensures that these exposure gaps are below the photographic media's exposure threshold.

Figure 12:
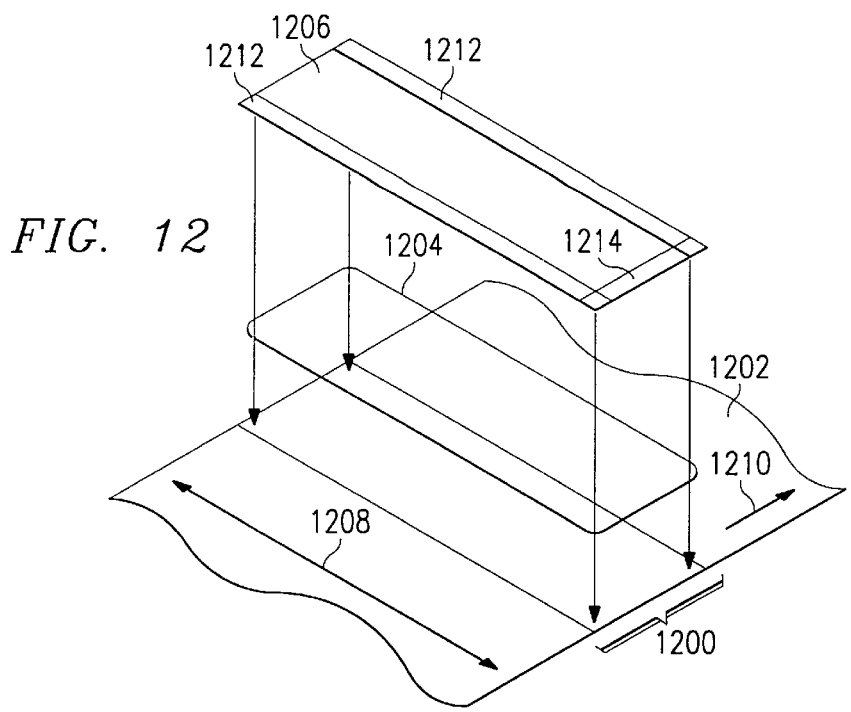
FIG. 12 is a perspective view of an array of spatial light modulator elements, or modulated light sources, exposing a photosensitive medium.

The eighty-four potential exposures are created in FIG. 12 by modulating a light beam 1204 focused onto region 1200 of a continuous length of photographic material 1202. The modulated light beam is created by a modulated light source 1206 which is either an array of individually controllable light sources or a light source and an array of light modulator elements. For example, the modulated light source 1206 may be an array of individually operable light emitting diodes (LEDs), or a single LED or other light source in combination with an array of individually operable light modulating elements such as a micromirror array. As discussed below, the modulated light source potentially is capable of outputting various levels of energy. To avoid having to scan across the photosensitive material in the fast scan direction 1208 (across the four-inch paper), the modulated light beam must contain at least 1320 columns 1214 in order to perform the exposure on a 4 inch paper at 330 lines per inch. Higher or lower resolutions across the fast scan direction are possible, depending on the application.

Figure 13:
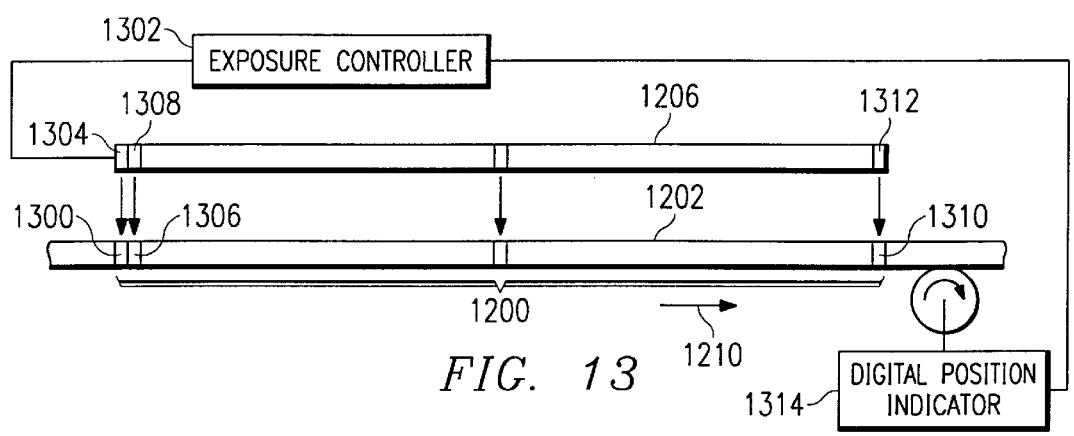
FIG. 13 is a schematic view showing the exposure of one column of pixels on a photosensitive medium according to one embodiment of the disclosed invention.

FIG. 13 details the exposure of one column, in the process direction 1210, of the photosensitive material 1202 as it moves through the region 1200 exposed by the modulated light source 1206. Only one column of the modulated light source 1206 is shown in FIG. 13. FIG. 13 is a schematic representation looking sideways at the photosensitive medium of the photographic printing process and as such is not intended to be a scale representation of the actual exposure mechanism. Additionally, the projection optics and paper transport mechanisms are not shown in FIG. 13. the example is for a single-color exposure, using 12 bits of grayscale.

As a portion of the photosensitive material 1202 reaches the first exposure location 1300, the exposure controller 1302 provides exposure data for the first exposure of the photosensitive material at first exposure location 1300 to the first element 1304 in the column of the modulated light source 1206. Depending on the exposure data provided to the first element 1304, the photosensitive material at the first exposure location 1300 is either exposed, or not exposed. The exposure data provided by the exposure controller 1302 also determines the exposure energy imparted to the photosensitive material at the first exposure location 1300.

As the photosensitive material continues to move in direction 1210, the photosensitive material that was exposed at the first exposure location 1300 will progress to the second exposure location 1306 and potentially be exposed by the second element 1308. The photosensitive material will continue to move until the photosensitive material exposed at the first and second exposure locations 1300, 1306 reaches the eighty-fourth, and final, exposure location 1310 and is possibly exposed by the eighty-fourth element 1312 in the column. The exposure controller tracks the progress of the photosensitive material 1202 through region 1200 and synchronizes the operation of the elements in the modulated light source to the progress of the photosensitive material 1202 by virtue of a closed-loop position indicator 1314.

The exposure controller 1302 determines which of the eighty-four potential exposures is performed by each row of the modulated light source. As discussed below, while various advantages and efficiencies are achieved by the careful ordering of the exposures, each of the eight-four exposures potentially can occur at any location within the exposure region 1200.

As discussed above, the image data comprising each picture includes a data word for each of the component colors for each pixel of the picture. Each data word is used to determine how much exposure energy is imparted to each location on the photosensitive material. The energy imparted to each location is regulated either by controlling the energy of the modulated light beam, by controlling the total number of rows exposed, or by controlling the exposure duration for any row. The blurring effect discussed above, which occurs during long exposure periods, suggests an advantage to reducing the total exposure duration to 25% of the row period. This reduction is required to reduce blurring, regardless of whether the exposure energy is modulated by controlling the energy of the modulated light beam or by controlling the exposure duration of each pixel. Longer durations are possible, but may produce undesired image degradation.

Figure 14:
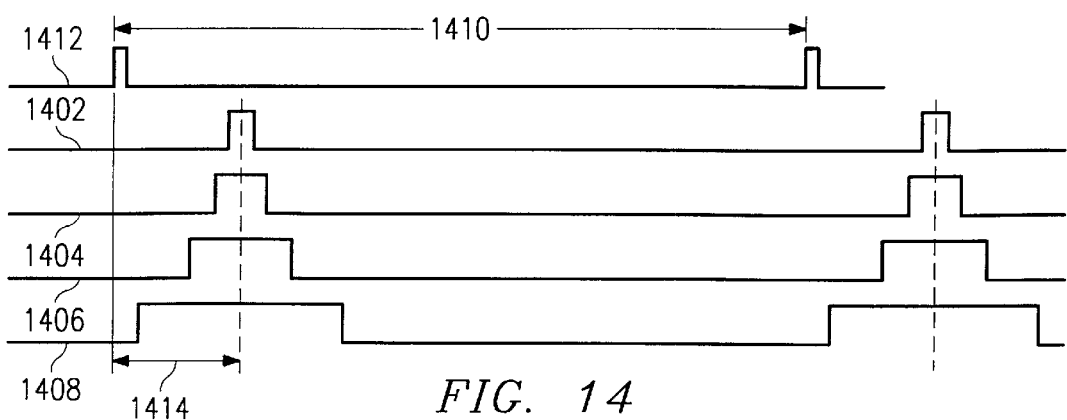
FIG. 14 is a timing diagram showing the alignment of four different exposure periods.

When multiple exposure durations are used, the center of each period is aligned to a particular point during each row period. Because each exposure is elongated in the process direction by the movement of the photosensitive material, starting each exposure period at the same time during the row period misaligns the exposed regions of the photosensitive material. FIG. 14 is a timing diagram showing the alignment of four pulse width modulated exposure periods 1402, 1404, 1406, and 1408 within a row period 1410. Aligning the center of each exposure period such that each center is delayed from a row timing signal 1412 by a delay period 1414, improves image quality by centering the images formed by each row of the modulator array.

Because only eighty-four rows of modulator elements are required to completely expose the photosensitive material for any color, the complexity and cost of the optics used to focus the modulated light beam onto the photosensitive material is reduced. The exposure region 1200 is not limited, however, to a region eighty-four locations long—additional modulator rows are sometimes used to perform the eighty-four exposures. Additional modulator rows provide redundancy necessary to operate after the failure of some modulator elements. Depending on the desired complexity of the control circuitry, the anticipated failure rate, and the cost of procuring error-free modulator arrays, the photographic printer is designed to compensate for some failed modulator elements—both during initial fabrication and during the lifetime of the printer.

Figure 15:
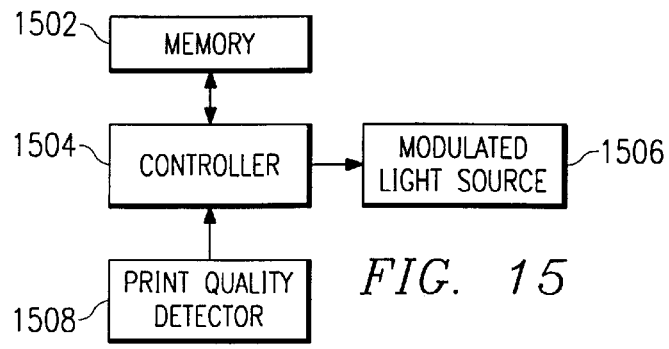
FIG. 15 is a block diagram of a portion of a printer system showing the use of a memory to allow a controller to track non-functioning elements in a modulated light source array such as a spatial light modulator array.

Several methods are available which enable modulator arrays with non-functioning elements to be used. A memory 1502, shown in FIG. 15, is provided to allow a controller 1504 to track the non-functioning elements in a modulated light source array 1506. If only manufacturing defects are compensated, the memory 1502 is loaded during the manufacturing cycle with the locations of the non-functioning elements. Alternatively, the controller 1504 stores the location of newly-failed elements in the memory 1502 in order to track elements that fail during the life of the printer. A print quality detector 1508 is used to detect failed elements, either during operation or during a self-test cycle. As an alternative to the print quality detector 1508, or in addition to the print quality detector 1508, newly-failed elements are detected by service personnel and the location of the newly-failed elements is loaded into the memory 1502. Failed elements are avoided either individually, or by not utilizing an entire row containing a failed element.

The ability to compensate for failed modulator elements not only allows the printer to continue functioning after some of the modulator elements fail, it also dramatically lowers the cost of some types of arrays. For example, large-array defect-free DMDs are very difficult to produce—which increases the cost of defect-free DMDs. DMDs with defect rates of only a few elements per million, however, are easily fabricated. Thus, DMD arrays with well over 1000 rows of elements typically only have a few non-functional elements. By utilizing a few additional rows of modulator elements to avoid rows having defective elements, partially defective arrays are used. Alternatively, very large arrays having a few defective elements are used by selecting a portion of the very large array that contains a contiguous segment of functioning elements large enough to generate the required images.

Figure 16:
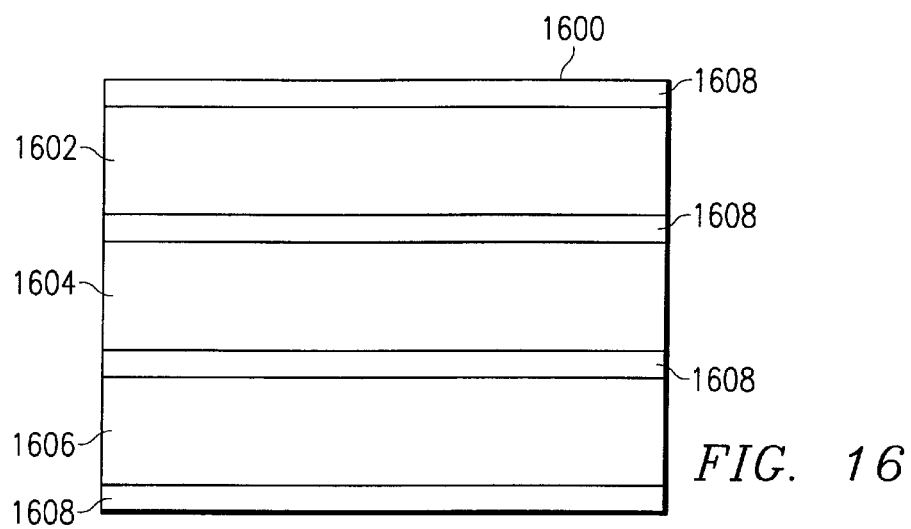
FIG. 16 is a schematic view of a modulated light source, or light modulator array, capable of creating three separate single-color images.

Up to this point the discussion has only addressed creating a single-color image. A full-color image is created by separately creating three single-color images using three carefully selected single-color sources with wavelengths matched to the spectral response of the photosensitive medium. FIG. 16 shows a modulated light source, or light modulator array 1600 capable of creating three separate single-color images. The light modulator array 1600 is logically subdivided into three sub-groups 1602, 1604, and 1606 of element arrays, each producing or controlling a unique single-color modulated beam of light.

A sub-group 1602 of eighty-four rows of elements creates a red beam of modulated light, a sub-group 1604 of eighty-four rows of elements creates a green beam of modulated light, and a sub-group 1606 of eighty-four rows of elements creates a blue beam of modulated light. The sub-groups create a beam of modulated light either by emitting the modulated light or by modulating an incident beam of light. The embodiment shown in FIG. 16 also shows optional border regions 1608 comprising the rows above and beneath each sub-group 1602, 1604, and 1606. The border regions 1608 are unused rows of modulator elements that allow optical separation of the respective colors.

By way of example, and not by way of limitation, each of the three groups of elements is a unique type of LED array capable of creating a unique color of light. Alternatively, each sub-group is a group of micromirror elements in combination with a color filter and illuminated by a white-light source. Yet another alternative uses a reflective or transmissive LCD array for each sub-group. The unused rows of micromirror elements comprising the border regions 1608 make alignment of the filters with the modulator array much easier. According to one embodiment, 10 each sub-group of active elements 1602, 1604, and 1606 is comprised of 256 rows of micromirror elements, which each border region 1608 is comprised of 64 rows of micromirror elements.

Figure 17:
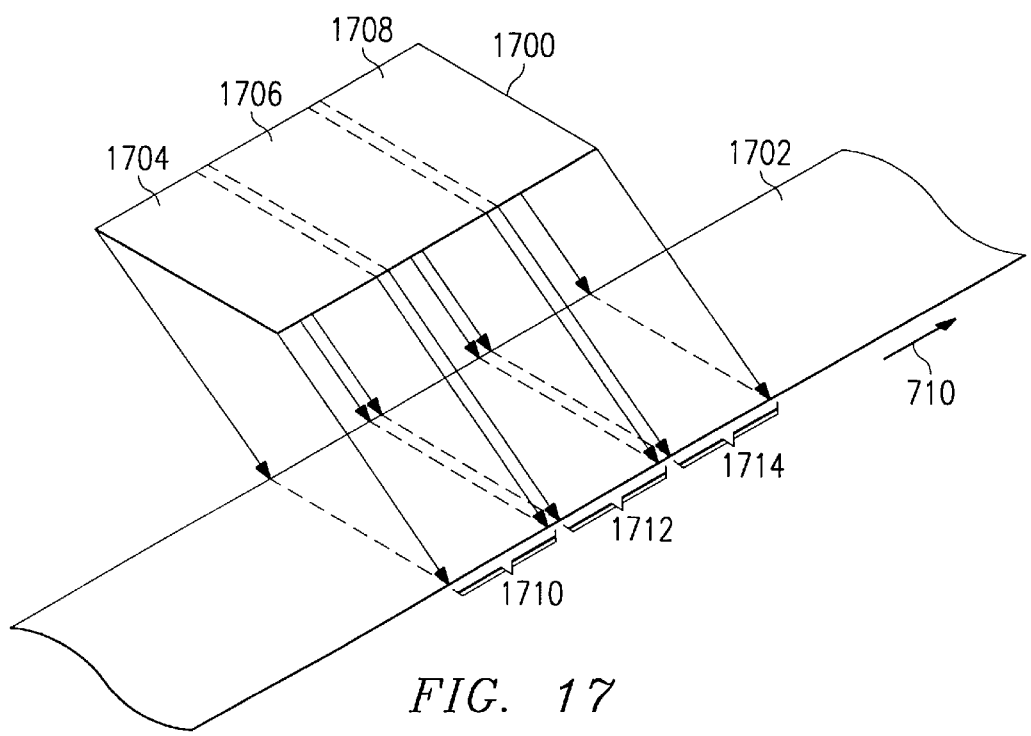
FIG. 17 is a perspective view of the three-color modulated light source of FIG. 16 exposing a photosensitive medium as it moves in a process direction.

FIG. 17 shows a three-color modulated light source 1700 exposing a continuous length of photosensitive material 1702 as it moves in the process direction 710. Three regions of the modulated light source 1704, 1706, and 1708, each expose a separate exposure region 1710, 1712, and 1714, on the photosensitive material 1702.

Several drawbacks are associated with embodiments which use filters associated with a portion of the exposure array. First, fixed filters in the imaging path of the photographic printer create ghost images which reduce the contrast ratio of the exposure image. All optical elements reflect at least a portion of incident light. This reflected light, if it occurs in the imaging path of the exposure unit, is focused onto the exposure region—creating ghost images and reducing the optical contrast ratio of the exposure unit.

A second disadvantage of fixed filters is the high cost of implementing a fixed filter design. Fixed filters must be precisely aligned with the rows of the modulator array. This alignment step drives up the cost of producing the exposure unit. The alignment step also virtually requires the filters to be fabricated onto the modulator array—further reducing the yield of useable modulator arrays.

A third disadvantage of fixed filters relates to the durability of existing filters. Typical filters, such as dichroic filters deposited on the modulator array itself, have a relatively soft surface. This soft surface is easily damaged if it comes in contact with another surface, or if it must be cleaned. If the filter is deposited on the modulator array, then a scratched filter requires replacing the modulator array.

A fourth disadvantage of fixed filters only occurs when the fixed filters are fabricated on the modulator array— which as mentioned above is typically done to meet the alignment requirements. If different applications require different filter characteristics, fabricating the filter on the modulator array limits the use of a modulator array to a single application—driving up the number of unique modulator arrays which must be produced and inventoried and preventing users of the photoprinter from changing the color filters to better expose different types or brands of photographic paper.

Figure 18:
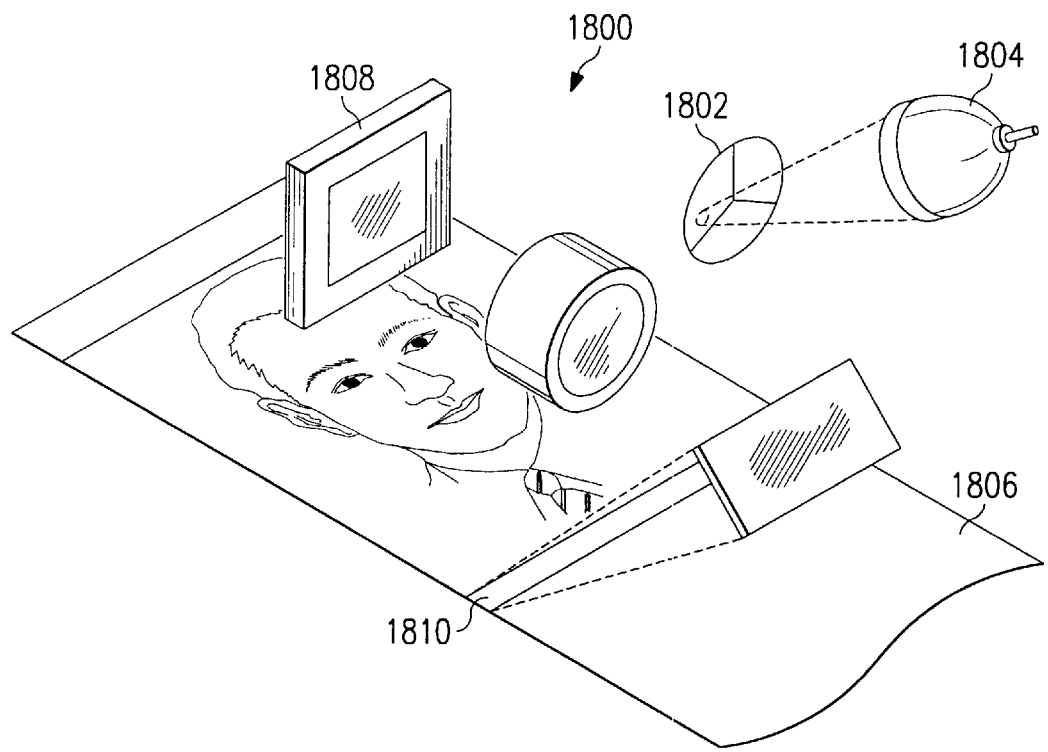
FIG. 18 is a perspective view of the major optical components in an optical printer including a color wheel to sequentially generate single-color light, a light modulator to modulate the single-color light, and optical components to focus the modulated light onto a continuously moving photosensitive medium.
Figure 19:
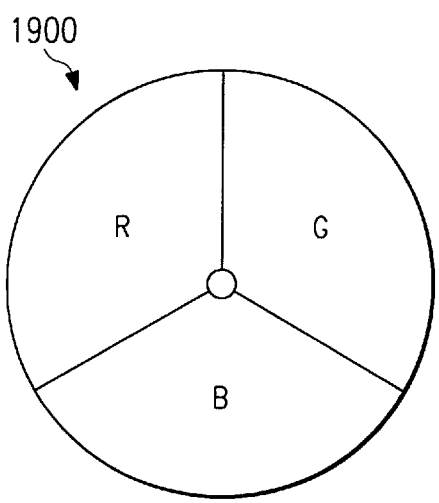
FIG. 19 is a plan view of a three-segment color wheel.

An alternative to the fixed filter exposure system of FIG. 17 is shown in FIG. 18. In FIG. 18 a color wheel 1802 is spun in the illumination path of the exposure system. Light from light source 1804, typically a tungsten lamp, is focused onto a very small region of the color wheel 1802 so that light from the color wheel 1802 is a single color a majority of the time. Although a transmissive color wheel 1802 is shown, reflective color wheels are also used. FIG. 19 is a plan view of a typical three-segment color wheel 1900.

The color wheel 1802 is spun, typically between 300 and 1100 revolutions per minute, and is synchronized to the movement in the process direction of the photosensitive material 1806. According to one embodiment of a color wheel based exposure system 1800 and modulation scheme, a 285 row modulator array 1808 is used to expose a region 1810 of the photosensitive material 1806 84 times for each of three colors. The duration of one revolution of the color wheel 1802 is equal to the length of the exposure region divided by the process speed. Thus, the 285 row modulator array 1808 creates an exposure region 1810 285 rows wide on the photosensitive material 1806, and the time it takes a point on the photosensitive material 1806 to traverse the exposure region 1810 is equal to the time it takes the color wheel 1802 to complete one revolution.

Of the 285 exposure opportunities which occur as the photosensitive material passes through the exposure region, 252 are used. The 33 exposure opportunities which are not used allow the modulator to be turned off during the spoke periods, periods in which more than one color filter is in the light path. Thus, there are three single-color 84-exposure periods and three 11-exposure spoke periods during one revolution of the color wheel.

FIG. 20 is a schematic view of the system of FIG. 17 exposing a photosensitive material 2000. FIGS. 20 through 26 will be described in terms of exposing a single image on a continuous strip of a photosensitive material 2000, typically a photographic paper. Although the description will only involve a single image, it should be understood that the exposure is a continuous process which exposes many images sequentially on the strip of photosensitive material 2000 with little or no gap between the images. Therefore, while the image exposure described is being exposed, the modulator array is also exposing a previous or subsequent image.

In FIG. 20, the white-light light beam 2002 from a light source passes through the red segment 2004 of color wheel 2006 (shown as a linear set of three transmission filters to simplify this explanation), before illuminating all of the modulator array 2008 (shown as a single column of elements for illustrative purposes). The modulator array 2008 modulates the light, in this case by selectively transmitting or reflecting the light, to expose the photosensitive material 2000 across the entire exposure region 2010. The exposure region for the period of one exposure (out of 285 in this case) is typically referred to as a "micro-image." The full exposure of any row of pixels across the paper thus requires a total of 285 "micro-images." The photosensitive material 2000 is continuously moving in the process direction. After one exposure period, typically limited to 25% of the row period, the modulator array 2008 stops exposing the photosensitive material 2000. When the photosensitive material 2000 reaches the next exposure position, the modulator array 2008 begins a new exposure period and exposes the first 2012 and second 2032 rows of the photosensitive material 2000. This process continues for 84 exposure periods.

After 84 exposure periods, as shown in FIG. 21, the first row of the photosensitive material 2000 has been completely exposed by the red light and the white-light light beam begins to strike the first spoke region 2014. The modulator array 2008 stops exposing the photosensitive material 2000 while the color wheel spins through the spoke region. Although the exposures have stopped, the photosensitive material 2000 continues to advance in the process direction.

FIGS. 21 though 26 also include a table 2030 listing the number of exposure opportunities each region of the photosensitive material has been given. Depending on the image data, not all of the exposure opportunities will result in an actual exposure period. The number of exposure opportunities shown in the table 2030 is the maximum number of exposures possible and will only equal the actual number of exposures when the image data for a pixel calls for a maximal exposure. As shown by the table 2030, the second row 2032 of the photosensitive material 2000 has only received 83 of the 84 red exposure opportunities necessary to completely expose it, and the eighty-fourth row of the photosensitive material 2016 has only received one red exposure opportunity.

Once the spoke period begins, the modulator array 2008 ceases exposing locations on the photosensitive material 2000 until the spoke period has ended. After the spoke period ends, the exposure period for the second color, in this case green, begins.

FIG. 22 shows the relative position of the photosensitive material 2000 and the color wheel 2006 as the light passes through only the green filter 2018 at the beginning of the green exposure period. The first row 2012 of the photosensitive material 2000 has now advanced to exposure position 96, and the 96th row 2020 of the photosensitive material 2000 has entered the exposure region 2010. All rows in the exposure region 2010 begin having green-light exposure opportunities. The exposure controller determines whether the rows in the exposure region 2010 will actually receive green-light exposures, and if so how much energy they will receive, based on the image data.

After 84 green exposure opportunities, the color wheel enters a second spoke period and exposure of the photosensitive material 2000 temporarily stops. FIG. 23 shows the position of the color wheel 2006 and the photosensitive material 2000 at the end of the green exposure period. The first row 2012 has now received 84 red exposure opportunities and 84 green exposure opportunities. Rows 2 2032 through 84 2016 have received some red exposure opportunities and 84 green exposure opportunities. Rows 85 through 96 have received no red exposure opportunities and 84 green exposure opportunities. Rows 97 through 179 have received no red exposure opportunities and some green exposure opportunities, with row 179 2034 having received only a single green exposure opportunity.

FIG. 24 shows the relative positions of the color wheel 2006 and the photosensitive material 2000 as the beam of white light enters the blue filter 2036 at the beginning of the blue exposure period. FIG. 25 shows the relative positions of the color wheel 2006 and the photosensitive material 2000 at the end of the blue exposure period. By the end of the blue exposure period, rows 1 2012 through 191 2038 have received 84 blue exposure opportunities while rows 192 through 274 2040 have received at least one blue exposure opportunity. Only row 1 2012 has received a full 84 exposure opportunities, and rows 85 through 274 2040 have not received any red exposure opportunities. Rows 1 2012 through 96 2034 have been fully exposed, and rows 97 through 179 partially exposed, by the green light.

Figure 26:
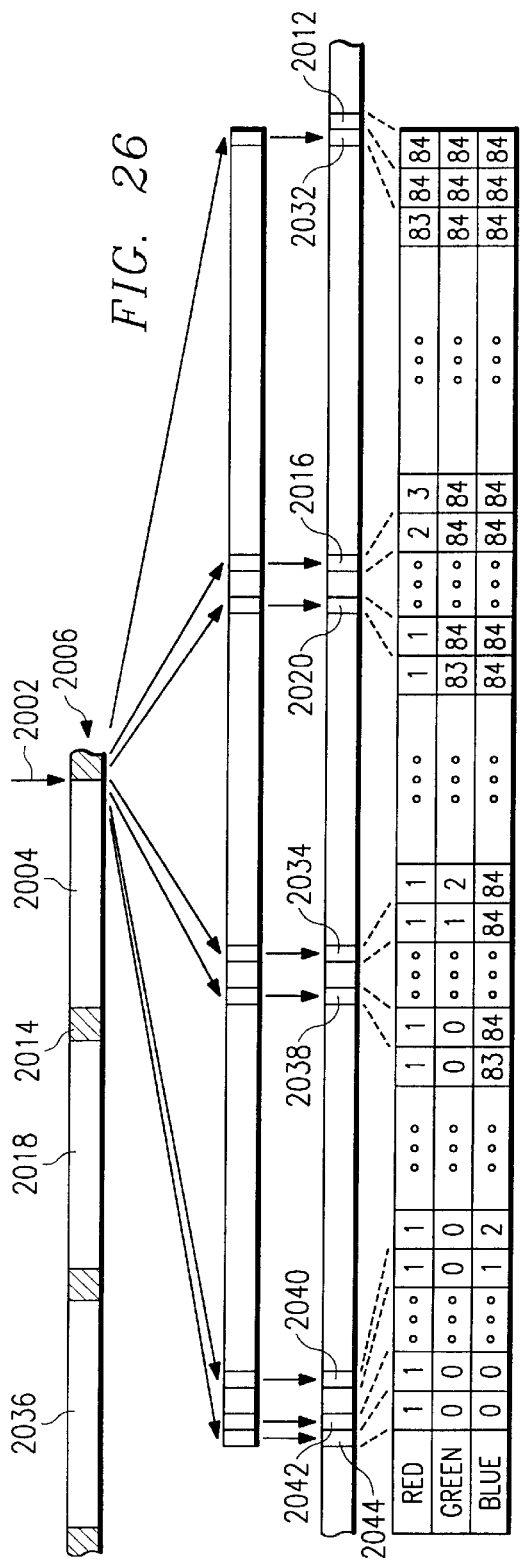
FIG. 26 is a schematic view of the exposure process shown in FIG. 25, showing a later exposure than the exposure shown in FIG. 25.
Figure 27:
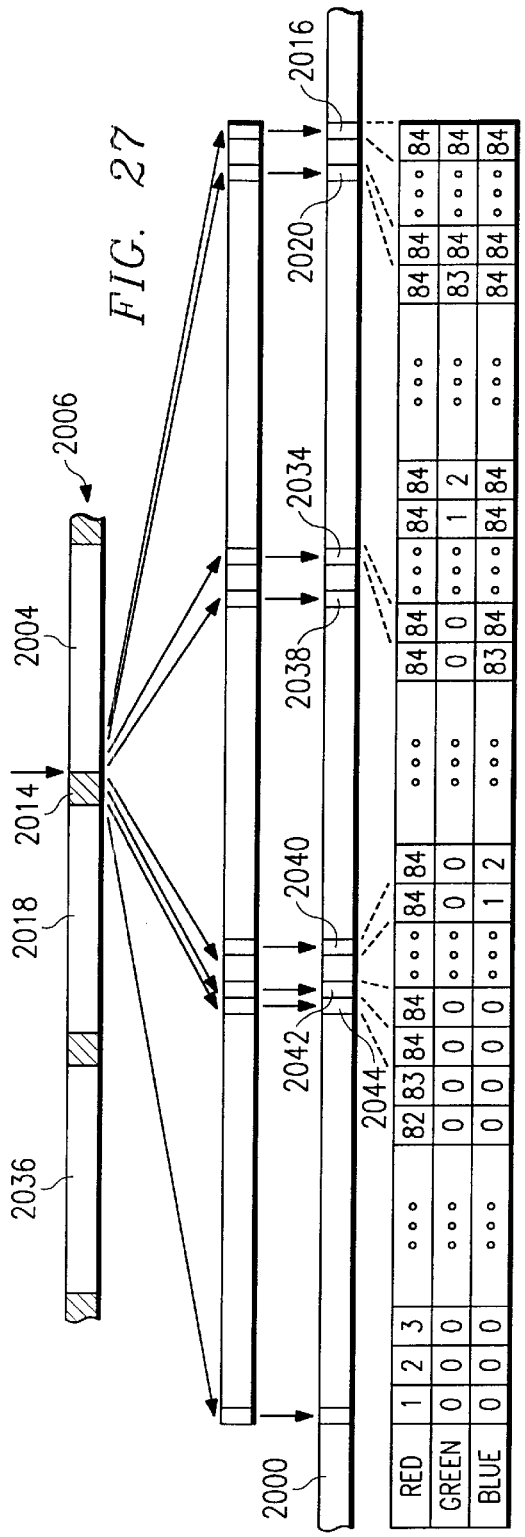
FIG. 27 is a schematic view of the exposure process shown in FIG. 26, showing a later exposure than the exposure shown in FIG. 26.

Referring to FIG. 26, after a third spoke period, the color wheel 2006 has returned to the position it occupied while exposing the first row 2012. The first row 2012 of the image has now moved out of the exposure region. The second row 2032 is at the edge of the exposure region and receives its eighty-fourth, and last, red exposure opportunity. Rows 3 through 84 also receive red exposure opportunities to complete red exposures which began during the first red-light period. Rows 85 through 285 2042 receive their first red exposure opportunity. Row 285 2042 entered the exposure region during the spoke period and has now progressed to the second exposure location. Row 286 2044, which entered the exposure period at the beginning of the second exposure, is equivalent to row 1 2012 and will not be discussed further.

FIGS. 27 through 31 detail the exposure opportunities presented by the second revolution of the color wheel 2006. In FIGS. 27 through 31, the first 285 rows receive their last exposure opportunities for each of the three light colors. After FIG. 31, the third spoke once again halts exposure of the photosensitive material after the modulator array has provided 84 exposure opportunities to each of the 285 rows.

Table 2 summarizes the exposure cycle shown in FIGS. 20 through 31. Table 2 lists the beginning and ending locations for 285 consecutive rows of the photosensitive material, for both the first and second revolutions of the color wheel. The exposure pattern shown in Table 2 repeats each revolution of the color wheel. The first line of the second pattern enters the exposure region at the beginning of the second revolution. Thus, each revolution of the color wheel is the second exposure revolution for one set of 285 rows and the first exposure revolution for the next set of 285 rows.

TABLE 2

| Paper Row | RED 1st Rotation | | RED 2nd Rotation | | GREEN 1st Rotation | | GREEN 2nd Rotation | | BLUE 1st Rotation | | BLUE 2nd Rotation | |
|---|---|---|---|---|---|---|---|---|---|---|---|---|
| | Start | Finish | Start | Finish | Start | Finish | Start | Finish | Start | Finish | Start | Finish |
| 1 | 1 | 84 | | | 96 | 179 | | | 191 | 274 | | |
| 2 | 1 | 83 | 285 | 285 | 95 | 178 | | | 190 | 273 | | |
| 3 | 1 | 82 | 284 | 285 | 94 | 177 | | | 189 | 272 | | |
| 4 | 1 | 81 | 283 | 285 | 93 | 176 | | | 188 | 271 | | |
| 5 | 1 | 80 | 282 | 285 | 92 | 175 | | | 187 | 270 | | |
| 6 | 1 | 79 | 281 | 285 | 91 | 174 | | | 186 | 269 | | |
| 7 | 1 | 78 | 280 | 285 | 90 | 173 | | | 185 | 268 | | |
| 8 | 1 | 77 | 279 | 285 | 89 | 172 | | | 184 | 267 | | |
| 9 | 1 | 76 | 278 | 285 | 88 | 171 | | | 183 | 266 | | |
| 10 | 1 | 75 | 277 | 285 | 87 | 170 | | | 182 | 265 | | |
| 11 | 1 | 74 | 276 | 285 | 86 | 169 | | | 181 | 264 | | |
| 12 | 1 | 73 | 275 | 285 | 85 | 168 | | | 180 | 263 | | |
| 13 | 1 | 72 | 274 | 285 | 84 | 167 | | | 179 | 262 | | |
| 14 | 1 | 71 | 273 | 285 | 83 | 166 | | | 178 | 261 | | |
| 15 | 1 | 70 | 272 | 285 | 82 | 165 | | | 177 | 260 | | |
| 16 | 1 | 69 | 271 | 285 | 81 | 164 | | | 176 | 259 | | |
| 17 | 1 | 68 | 270 | 285 | 80 | 163 | | | 175 | 258 | | |
| 18 | 1 | 67 | 269 | 285 | 79 | 162 | | | 174 | 257 | | |
| 19 | 1 | 66 | 268 | 285 | 78 | 161 | | | 173 | 256 | | |
| 20 | 1 | 65 | 267 | 285 | 77 | 160 | | | 172 | 255 | | |
| 21 | 1 | 64 | 266 | 285 | 76 | 159 | | | 171 | 254 | | |
| 22 | 1 | 63 | 265 | 285 | 75 | 158 | | | 170 | 253 | | |
| 23 | 1 | 62 | 264 | 285 | 74 | 157 | | | 169 | 252 | | |
| 24 | 1 | 61 | 263 | 285 | 73 | 156 | | | 168 | 251 | | |
| 25 | 1 | 60 | 262 | 285 | 72 | 155 | | | 167 | 250 | | |
| 26 | 1 | 59 | 261 | 285 | 71 | 154 | | | 166 | 249 | | |
| 27 | 1 | 58 | 260 | 285 | 70 | 153 | | | 165 | 248 | | |
| 28 | 1 | 57 | 259 | 285 | 69 | 152 | | | 164 | 247 | | |
| 29 | 1 | 56 | 258 | 285 | 68 | 151 | | | 163 | 246 | | |
| 30 | 1 | 55 | 257 | 285 | 67 | 150 | | | 162 | 245 | | |
| 31 | 1 | 54 | 256 | 285 | 66 | 149 | | | 161 | 244 | | |
| 32 | 1 | 53 | 255 | 285 | 65 | 148 | | | 160 | 243 | | |
| 33 | 1 | 52 | 254 | 285 | 64 | 147 | | | 159 | 242 | | |
| 34 | 1 | 51 | 253 | 285 | 63 | 146 | | | 158 | 241 | | |
| 35 | 1 | 50 | 252 | 285 | 62 | 145 | | | 157 | 240 | | |
| 36 | 1 | 49 | 251 | 285 | 61 | 144 | | | 156 | 239 | | |
| 37 | 1 | 48 | 250 | 285 | 60 | 143 | | | 155 | 238 | | |
| 38 | 1 | 47 | 249 | 285 | 59 | 142 | | | 154 | 237 | | |
| 39 | 1 | 46 | 248 | 285 | 58 | 141 | | | 153 | 236 | | |
| 40 | 1 | 45 | 247 | 285 | 57 | 140 | | | 152 | 235 | | |
| 41 | 1 | 44 | 246 | 285 | 56 | 139 | | | 151 | 234 | | |
| 42 | 1 | 43 | 245 | 285 | 55 | 138 | | | 150 | 233 | | |
| 43 | 1 | 42 | 244 | 285 | 54 | 137 | | | 149 | 232 | | |
| 44 | 1 | 41 | 243 | 285 | 53 | 136 | | | 148 | 231 | | |
| 45 | 1 | 40 | 242 | 285 | 52 | 135 | | | 147 | 230 | | |

TABLE 2-continued

| Paper Row | RED | | | | GREEN | | | | BLUE | | | |
|---|---|---|---|---|---|---|---|---|---|---|---|---|
| | 1st Rotation | | 2nd Rotation | | 1st Rotation | | 2nd Rotation | | 1st Rotation | | 2nd Rotation | |
| | Start | Finish | Start | Finish | Start | Finish | Start | Finish | Start | Finish | Start | Finish |
| 46 | 1 | 39 | 241 | 285 | 51 | 134 | | | 146 | 229 | | |
| 47 | 1 | 38 | 240 | 285 | 50 | 133 | | | 145 | 228 | | |
| 48 | 1 | 37 | 239 | 285 | 49 | 132 | | | 144 | 227 | | |
| 49 | 1 | 36 | 238 | 285 | 48 | 131 | | | 143 | 226 | | |
| 50 | 1 | 35 | 237 | 285 | 47 | 130 | | | 142 | 225 | | |
| 51 | 1 | 34 | 236 | 285 | 46 | 129 | | | 141 | 224 | | |
| 52 | 1 | 33 | 235 | 285 | 45 | 128 | | | 140 | 223 | | |
| 53 | 1 | 32 | 234 | 285 | 44 | 127 | | | 139 | 222 | | |
| 54 | 1 | 31 | 233 | 285 | 43 | 126 | | | 138 | 221 | | |
| 55 | 1 | 30 | 232 | 285 | 42 | 125 | | | 137 | 220 | | |
| 56 | 1 | 29 | 231 | 285 | 41 | 124 | | | 136 | 219 | | |
| 57 | 1 | 28 | 230 | 285 | 40 | 123 | | | 135 | 218 | | |
| 58 | 1 | 27 | 229 | 285 | 39 | 122 | | | 134 | 217 | | |
| 59 | 1 | 26 | 228 | 285 | 38 | 121 | | | 133 | 216 | | |
| 60 | 1 | 25 | 227 | 285 | 37 | 120 | | | 132 | 215 | | |
| 61 | 1 | 24 | 226 | 285 | 36 | 119 | | | 131 | 214 | | |
| 62 | 1 | 23 | 225 | 285 | 35 | 118 | | | 130 | 213 | | |
| 63 | 1 | 22 | 224 | 285 | 34 | 117 | | | 129 | 212 | | |
| 64 | 1 | 21 | 223 | 285 | 33 | 116 | | | 128 | 211 | | |
| 65 | 1 | 20 | 222 | 285 | 32 | 115 | | | 127 | 210 | | |
| 66 | 1 | 19 | 221 | 285 | 31 | 114 | | | 126 | 209 | | |
| 67 | 1 | 18 | 220 | 285 | 30 | 113 | | | 125 | 208 | | |
| 68 | 1 | 17 | 219 | 285 | 29 | 112 | | | 124 | 207 | | |
| 69 | 1 | 16 | 218 | 285 | 28 | 111 | | | 123 | 206 | | |
| 70 | 1 | 15 | 217 | 285 | 27 | 110 | | | 122 | 205 | | |
| 71 | 1 | 14 | 216 | 285 | 26 | 109 | | | 121 | 204 | | |
| 72 | 1 | 13 | 215 | 285 | 25 | 108 | | | 120 | 203 | | |
| 73 | 1 | 12 | 214 | 285 | 24 | 107 | | | 119 | 202 | | |
| 74 | 1 | 11 | 213 | 285 | 23 | 106 | | | 118 | 201 | | |
| 75 | 1 | 10 | 212 | 285 | 22 | 105 | | | 117 | 200 | | |
| 76 | 1 | 9 | 211 | 285 | 21 | 104 | | | 116 | 199 | | |
| 77 | 1 | 8 | 210 | 285 | 20 | 103 | | | 115 | 198 | | |
| 78 | 1 | 7 | 209 | 285 | 19 | 102 | | | 114 | 197 | | |
| 79 | 1 | 6 | 208 | 285 | 18 | 101 | | | 113 | 196 | | |
| 80 | 1 | 5 | 207 | 285 | 17 | 100 | | | 112 | 195 | | |
| 81 | 1 | 4 | 206 | 285 | 16 | 99 | | | 111 | 194 | | |
| 82 | 1 | 3 | 205 | 285 | 15 | 98 | | | 110 | 193 | | |
| 83 | 1 | 2 | 204 | 285 | 14 | 97 | | | 109 | 192 | | |
| 84 | 1 | 1 | 203 | 285 | 13 | 96 | | | 108 | 191 | | |
| 85 | | | 202 | 285 | 12 | 95 | | | 107 | 190 | | |
| 86 | | | 201 | 284 | 11 | 94 | | | 106 | 189 | | |
| 87 | | | 200 | 283 | 10 | 93 | | | 105 | 188 | | |
| 88 | | | 199 | 282 | 9 | 92 | | | 104 | 187 | | |
| 89 | | | 198 | 281 | 8 | 91 | | | 103 | 186 | | |
| 90 | | | 197 | 280 | 7 | 90 | | | 102 | 185 | | |
| 91 | | | 196 | 279 | 6 | 89 | | | 101 | 184 | | |
| 92 | | | 195 | 278 | 5 | 88 | | | 100 | 183 | | |
| 93 | | | 194 | 277 | 4 | 87 | | | 99 | 182 | | |
| 94 | | | 193 | 276 | 3 | 86 | | | 98 | 181 | | |
| 95 | | | 192 | 275 | 2 | 85 | | | 97 | 180 | | |
| 96 | | | 191 | 274 | 1 | 84 | | | 96 | 179 | | |
| 97 | | | 190 | 273 | 1 | 83 | 285 | 285 | 95 | 178 | | |
| 98 | | | 189 | 272 | 1 | 82 | 284 | 285 | 94 | 177 | | |
| 99 | | | 188 | 271 | 1 | 81 | 283 | 285 | 93 | 176 | | |
| 100 | | | 187 | 270 | 1 | 80 | 282 | 285 | 92 | 175 | | |
| 101 | | | 186 | 269 | 1 | 79 | 281 | 285 | 91 | 174 | | |
| 102 | | | 185 | 268 | 1 | 78 | 280 | 285 | 90 | 173 | | |
| 103 | | | 184 | 267 | 1 | 77 | 279 | 285 | 89 | 172 | | |
| 104 | | | 183 | 266 | 1 | 76 | 278 | 285 | 88 | 171 | | |
| 105 | | | 182 | 265 | 1 | 75 | 277 | 285 | 87 | 170 | | |
| 106 | | | 181 | 264 | 1 | 74 | 276 | 285 | 86 | 169 | | |
| 107 | | | 180 | 263 | 1 | 73 | 275 | 285 | 85 | 168 | | |
| 108 | | | 179 | 262 | 1 | 72 | 274 | 285 | 84 | 167 | | |
| 109 | | | 178 | 261 | 1 | 71 | 273 | 285 | 83 | 166 | | |
| 110 | | | 177 | 260 | 1 | 70 | 272 | 285 | 82 | 165 | | |
| 111 | | | 176 | 259 | 1 | 69 | 271 | 285 | 81 | 164 | | |
| 112 | | | 175 | 258 | 1 | 68 | 270 | 285 | 80 | 163 | | |
| 113 | | | 174 | 257 | 1 | 67 | 269 | 285 | 79 | 162 | | |
| 114 | | | 173 | 256 | 1 | 66 | 268 | 285 | 78 | 161 | | |
| 115 | | | 172 | 255 | 1 | 65 | 267 | 285 | 77 | 160 | | |
| 116 | | | 171 | 254 | 1 | 64 | 266 | 285 | 76 | 159 | | |
| 117 | | | 170 | 253 | 1 | 63 | 265 | 285 | 75 | 158 | | |
| 118 | | | 169 | 252 | 1 | 62 | 264 | 285 | 74 | 157 | | |

TABLE 2-continued

| Paper | RED | | | | GREEN | | | | BLUE | | | |
|---|---|---|---|---|---|---|---|---|---|---|---|---|
| | 1st Rotation | | 2nd Rotation | | 1st Rotation | | 2nd Rotation | | 1st Rotation | | 2nd Rotation | |
| Row | Start | Finish | Start | Finish | Start | Finish | Start | Finish | Start | Finish | Start | Finish |
| 119 | | | 168 | 251 | 1 | 61 | 263 | 285 | 73 | 156 | | |
| 120 | | | 167 | 250 | 1 | 60 | 262 | 285 | 72 | 155 | | |
| 121 | | | 166 | 249 | 1 | 59 | 261 | 285 | 71 | 154 | | |
| 122 | | | 165 | 248 | 1 | 58 | 260 | 285 | 70 | 153 | | |
| 123 | | | 164 | 247 | 1 | 57 | 259 | 285 | 69 | 152 | | |
| 124 | | | 163 | 246 | 1 | 56 | 258 | 285 | 68 | 151 | | |
| 125 | | | 162 | 245 | 1 | 55 | 257 | 285 | 67 | 150 | | |
| 126 | | | 161 | 244 | 1 | 54 | 256 | 285 | 66 | 149 | | |
| 127 | | | 160 | 243 | 1 | 53 | 255 | 285 | 65 | 148 | | |
| 128 | | | 159 | 242 | 1 | 52 | 254 | 285 | 64 | 147 | | |
| 129 | | | 158 | 241 | 1 | 51 | 253 | 285 | 63 | 146 | | |
| 130 | | | 157 | 240 | 1 | 50 | 252 | 285 | 62 | 145 | | |
| 131 | | | 156 | 239 | 1 | 49 | 251 | 285 | 61 | 144 | | |
| 132 | | | 155 | 238 | 1 | 48 | 250 | 285 | 60 | 143 | | |
| 133 | | | 154 | 237 | 1 | 47 | 249 | 285 | 59 | 142 | | |
| 134 | | | 153 | 236 | 1 | 46 | 248 | 285 | 58 | 141 | | |
| 135 | | | 152 | 235 | 1 | 45 | 247 | 285 | 57 | 140 | | |
| 136 | | | 151 | 234 | 1 | 44 | 246 | 285 | 56 | 139 | | |
| 137 | | | 150 | 233 | 1 | 43 | 245 | 285 | 55 | 138 | | |
| 138 | | | 149 | 232 | 1 | 42 | 244 | 285 | 54 | 137 | | |
| 139 | | | 148 | 231 | 1 | 41 | 243 | 285 | 53 | 136 | | |
| 140 | | | 147 | 230 | 1 | 40 | 242 | 285 | 52 | 135 | | |
| 141 | | | 146 | 229 | 1 | 39 | 241 | 285 | 51 | 134 | | |
| 142 | | | 145 | 228 | 1 | 38 | 240 | 285 | 50 | 133 | | |
| 143 | | | 144 | 227 | 1 | 37 | 239 | 285 | 49 | 132 | | |
| 144 | | | 143 | 226 | 1 | 36 | 238 | 285 | 48 | 131 | | |
| 145 | | | 142 | 225 | 1 | 35 | 237 | 285 | 47 | 130 | | |
| 146 | | | 141 | 224 | 1 | 34 | 236 | 285 | 46 | 129 | | |
| 147 | | | 140 | 223 | 1 | 33 | 235 | 285 | 45 | 128 | | |
| 148 | | | 139 | 222 | 1 | 32 | 234 | 285 | 44 | 127 | | |
| 149 | | | 138 | 221 | 1 | 31 | 233 | 285 | 43 | 126 | | |
| 150 | | | 137 | 220 | 1 | 30 | 232 | 285 | 42 | 125 | | |
| 151 | | | 136 | 219 | 1 | 29 | 231 | 285 | 41 | 124 | | |
| 152 | | | 135 | 218 | 1 | 28 | 230 | 285 | 40 | 123 | | |
| 153 | | | 134 | 217 | 1 | 27 | 229 | 285 | 39 | 122 | | |
| 154 | | | 133 | 216 | 1 | 26 | 228 | 285 | 38 | 121 | | |
| 155 | | | 132 | 215 | 1 | 25 | 227 | 285 | 37 | 120 | | |
| 156 | | | 131 | 214 | 1 | 24 | 226 | 285 | 36 | 119 | | |
| 157 | | | 130 | 213 | 1 | 23 | 225 | 285 | 35 | 118 | | |
| 158 | | | 129 | 212 | 1 | 22 | 224 | 285 | 34 | 117 | | |
| 159 | | | 128 | 211 | 1 | 21 | 223 | 285 | 33 | 116 | | |
| 160 | | | 127 | 210 | 1 | 20 | 222 | 285 | 32 | 115 | | |
| 161 | | | 126 | 209 | 1 | 19 | 221 | 285 | 31 | 114 | | |
| 162 | | | 125 | 208 | 1 | 18 | 220 | 285 | 30 | 113 | | |
| 163 | | | 124 | 207 | 1 | 17 | 219 | 285 | 29 | 112 | | |
| 164 | | | 123 | 206 | 1 | 16 | 218 | 285 | 28 | 111 | | |
| 165 | | | 122 | 205 | 1 | 15 | 217 | 285 | 27 | 110 | | |
| 166 | | | 121 | 204 | 1 | 14 | 216 | 285 | 26 | 109 | | |
| 167 | | | 120 | 203 | 1 | 13 | 215 | 285 | 25 | 108 | | |
| 168 | | | 119 | 202 | 1 | 12 | 214 | 285 | 24 | 107 | | |
| 169 | | | 118 | 201 | 1 | 11 | 213 | 285 | 23 | 106 | | |
| 170 | | | 117 | 200 | 1 | 10 | 212 | 285 | 22 | 105 | | |
| 171 | | | 116 | 199 | 1 | 9 | 211 | 285 | 21 | 104 | | |
| 172 | | | 115 | 198 | 1 | 8 | 210 | 285 | 20 | 103 | | |
| 173 | | | 114 | 197 | 1 | 7 | 209 | 285 | 19 | 102 | | |
| 174 | | | 113 | 196 | 1 | 6 | 208 | 285 | 18 | 101 | | |
| 175 | | | 112 | 195 | 1 | 5 | 207 | 285 | 17 | 100 | | |
| 176 | | | 111 | 194 | 1 | 4 | 206 | 285 | 16 | 99 | | |
| 177 | | | 110 | 193 | 1 | 3 | 205 | 285 | 15 | 98 | | |
| 178 | | | 109 | 192 | 1 | 2 | 204 | 285 | 14 | 97 | | |
| 179 | | | 108 | 191 | 1 | 1 | 203 | 285 | 13 | 96 | | |
| 180 | | | 107 | 190 | | | 202 | 285 | 12 | 95 | | |
| 181 | | | 106 | 189 | | | 201 | 284 | 11 | 94 | | |
| 182 | | | 105 | 188 | | | 200 | 283 | 10 | 93 | | |
| 183 | | | 104 | 187 | | | 199 | 282 | 9 | 92 | | |
| 184 | | | 103 | 186 | | | 198 | 281 | 8 | 91 | | |
| 185 | | | 102 | 185 | | | 197 | 280 | 7 | 90 | | |
| 186 | | | 101 | 184 | | | 196 | 279 | 6 | 89 | | |
| 187 | | | 100 | 183 | | | 195 | 278 | 5 | 88 | | |
| 188 | | | 99 | 182 | | | 194 | 277 | 4 | 87 | | |
| 189 | | | 98 | 181 | | | 193 | 276 | 3 | 86 | | |
| 190 | | | 97 | 180 | | | 192 | 275 | 2 | 85 | | |
| 191 | | | 96 | 179 | | | 191 | 274 | 1 | 84 | | |

TABLE 2-continued

| | RED | | | | GREEN | | | | BLUE | | | |
|---|---|---|---|---|---|---|---|---|---|---|---|---|
| | 1st Rotation | | 2nd Rotation | | 1st Rotation | | 2nd Rotation | | 1st Rotation | | 2nd Rotation | |
| Paper Row | Start | Finish | Start | Finish | Start | Finish | Start | Finish | Start | Finish | Start | Finish |
| 192 | | | 95 | 178 | | | 190 | 273 | 1 | 83 | 285 | 285 |
| 193 | | | 94 | 177 | | | 189 | 272 | 1 | 82 | 284 | 285 |
| 194 | | | 93 | 176 | | | 188 | 271 | 1 | 81 | 283 | 285 |
| 195 | | | 92 | 175 | | | 187 | 270 | 1 | 80 | 282 | 285 |
| 196 | | | 91 | 174 | | | 186 | 269 | 1 | 79 | 281 | 285 |
| 197 | | | 90 | 173 | | | 185 | 268 | 1 | 78 | 280 | 285 |
| 198 | | | 89 | 172 | | | 184 | 267 | 1 | 77 | 279 | 285 |
| 199 | | | 88 | 171 | | | 183 | 266 | 1 | 76 | 278 | 285 |
| 200 | | | 87 | 170 | | | 182 | 265 | 1 | 75 | 277 | 285 |
| 201 | | | 86 | 169 | | | 181 | 264 | 1 | 74 | 276 | 285 |
| 202 | | | 85 | 168 | | | 180 | 263 | 1 | 73 | 275 | 285 |
| 203 | | | 84 | 167 | | | 179 | 262 | 1 | 72 | 274 | 285 |
| 204 | | | 83 | 166 | | | 178 | 261 | 1 | 71 | 273 | 285 |
| 205 | | | 82 | 165 | | | 177 | 260 | 1 | 70 | 272 | 285 |
| 206 | | | 81 | 164 | | | 176 | 259 | 1 | 69 | 271 | 285 |
| 207 | | | 80 | 163 | | | 175 | 258 | 1 | 68 | 270 | 285 |
| 208 | | | 79 | 162 | | | 174 | 257 | 1 | 67 | 269 | 285 |
| 209 | | | 78 | 161 | | | 173 | 256 | 1 | 66 | 268 | 285 |
| 210 | | | 77 | 160 | | | 172 | 255 | 1 | 65 | 267 | 285 |
| 211 | | | 76 | 159 | | | 171 | 254 | 1 | 64 | 266 | 285 |
| 212 | | | 75 | 158 | | | 170 | 253 | 1 | 63 | 265 | 285 |
| 213 | | | 74 | 157 | | | 169 | 252 | 1 | 62 | 264 | 285 |
| 214 | | | 73 | 156 | | | 168 | 251 | 1 | 61 | 263 | 285 |
| 215 | | | 72 | 155 | | | 167 | 250 | 1 | 60 | 262 | 285 |
| 216 | | | 71 | 154 | | | 166 | 249 | 1 | 59 | 261 | 285 |
| 217 | | | 70 | 153 | | | 165 | 248 | 1 | 58 | 260 | 285 |
| 218 | | | 69 | 152 | | | 164 | 247 | 1 | 57 | 259 | 285 |
| 219 | | | 68 | 151 | | | 163 | 246 | 1 | 56 | 258 | 285 |
| 220 | | | 67 | 150 | | | 162 | 245 | 1 | 55 | 257 | 285 |
| 221 | | | 66 | 149 | | | 161 | 244 | 1 | 54 | 256 | 285 |
| 222 | | | 65 | 148 | | | 160 | 243 | 1 | 53 | 255 | 285 |
| 223 | | | 64 | 147 | | | 159 | 242 | 1 | 52 | 254 | 285 |
| 224 | | | 63 | 146 | | | 158 | 241 | 1 | 51 | 253 | 285 |
| 225 | | | 62 | 145 | | | 157 | 240 | 1 | 50 | 252 | 285 |
| 226 | | | 61 | 144 | | | 156 | 239 | 1 | 49 | 251 | 285 |
| 227 | | | 60 | 143 | | | 155 | 238 | 1 | 48 | 250 | 285 |
| 228 | | | 59 | 142 | | | 154 | 237 | 1 | 47 | 249 | 285 |
| 229 | | | 58 | 141 | | | 153 | 236 | 1 | 46 | 248 | 285 |
| 230 | | | 57 | 140 | | | 152 | 235 | 1 | 45 | 247 | 285 |
| 231 | | | 56 | 139 | | | 151 | 234 | 1 | 44 | 246 | 285 |
| 232 | | | 55 | 138 | | | 150 | 233 | 1 | 43 | 245 | 285 |
| 233 | | | 54 | 137 | | | 149 | 232 | 1 | 42 | 244 | 285 |
| 234 | | | 53 | 136 | | | 148 | 231 | 1 | 41 | 243 | 285 |
| 235 | | | 52 | 135 | | | 147 | 230 | 1 | 40 | 242 | 285 |
| 236 | | | 51 | 134 | | | 146 | 229 | 1 | 39 | 241 | 285 |
| 237 | | | 50 | 133 | | | 145 | 228 | 1 | 38 | 240 | 285 |
| 238 | | | 49 | 132 | | | 144 | 227 | 1 | 37 | 239 | 285 |
| 239 | | | 48 | 131 | | | 143 | 226 | 1 | 36 | 238 | 285 |
| 240 | | | 47 | 130 | | | 142 | 225 | 1 | 35 | 237 | 285 |
| 241 | | | 46 | 129 | | | 141 | 224 | 1 | 34 | 236 | 285 |
| 242 | | | 45 | 128 | | | 140 | 223 | 1 | 33 | 235 | 285 |
| 243 | | | 44 | 127 | | | 139 | 222 | 1 | 32 | 234 | 285 |
| 244 | | | 43 | 126 | | | 138 | 221 | 1 | 31 | 233 | 285 |
| 245 | | | 42 | 125 | | | 137 | 220 | 1 | 30 | 232 | 285 |
| 246 | | | 41 | 124 | | | 136 | 219 | 1 | 29 | 231 | 285 |
| 247 | | | 40 | 123 | | | 135 | 218 | 1 | 28 | 230 | 285 |
| 248 | | | 39 | 122 | | | 134 | 217 | 1 | 27 | 229 | 285 |
| 249 | | | 38 | 121 | | | 133 | 216 | 1 | 26 | 228 | 285 |
| 250 | | | 37 | 120 | | | 132 | 215 | 1 | 25 | 227 | 285 |
| 251 | | | 36 | 119 | | | 131 | 214 | 1 | 24 | 226 | 285 |
| 252 | | | 35 | 118 | | | 130 | 213 | 1 | 23 | 225 | 285 |
| 253 | | | 34 | 117 | | | 129 | 212 | 1 | 22 | 224 | 285 |
| 254 | | | 33 | 116 | | | 128 | 211 | 1 | 21 | 223 | 285 |
| 255 | | | 32 | 115 | | | 127 | 210 | 1 | 20 | 222 | 285 |
| 256 | | | 31 | 114 | | | 126 | 209 | 1 | 19 | 221 | 285 |
| 257 | | | 30 | 113 | | | 125 | 208 | 1 | 18 | 220 | 285 |
| 258 | | | 29 | 112 | | | 124 | 207 | 1 | 17 | 219 | 285 |
| 259 | | | 28 | 111 | | | 123 | 206 | 1 | 16 | 218 | 285 |
| 260 | | | 27 | 110 | | | 122 | 205 | 1 | 15 | 217 | 285 |
| 261 | | | 26 | 109 | | | 121 | 204 | 1 | 14 | 216 | 285 |
| 262 | | | 25 | 108 | | | 120 | 203 | 1 | 13 | 215 | 285 |
| 263 | | | 24 | 107 | | | 119 | 202 | 1 | 12 | 214 | 285 |
| 264 | | | 23 | 106 | | | 118 | 201 | 1 | 11 | 213 | 285 |

TABLE 2-continued

| Paper Row | RED 1st Rotation | | 2nd Rotation | | GREEN 1st Rotation | | 2nd Rotation | | BLUE 1st Rotation | | 2nd Rotation | |
|---|---|---|---|---|---|---|---|---|---|---|---|---|
| | Start | Finish | Start | Finish | Start | Finish | Start | Finish | Start | Finish | Start | Finish |
| 265 | | | 22 | 105 | | | 117 | 200 | 1 | 10 | 212 | 285 |
| 266 | | | 21 | 104 | | | 116 | 199 | 1 | 9 | 211 | 285 |
| 267 | | | 20 | 103 | | | 115 | 198 | 1 | 8 | 210 | 285 |
| 268 | | | 19 | 102 | | | 114 | 197 | 1 | 7 | 209 | 285 |
| 269 | | | 18 | 101 | | | 113 | 196 | 1 | 6 | 208 | 285 |
| 270 | | | 17 | 100 | | | 112 | 195 | 1 | 5 | 207 | 285 |
| 271 | | | 16 | 99 | | | 111 | 194 | 1 | 4 | 206 | 285 |
| 272 | | | 15 | 98 | | | 110 | 193 | 1 | 3 | 205 | 285 |
| 273 | | | 14 | 97 | | | 109 | 192 | 1 | 2 | 204 | 285 |
| 274 | | | 13 | 96 | | | 108 | 191 | 1 | 1 | 203 | 285 |
| 275 | | | 12 | 95 | | | 107 | 190 | | | 201 | 284 |
| 276 | | | 11 | 94 | | | 106 | 189 | | | 200 | 283 |
| 277 | | | 10 | 93 | | | 105 | 188 | | | 199 | 282 |
| 278 | | | 9 | 92 | | | 104 | 187 | | | 198 | 281 |
| 279 | | | 8 | 91 | | | 103 | 186 | | | 197 | 280 |
| 280 | | | 7 | 90 | | | 102 | 185 | | | 196 | 279 |
| 281 | | | 6 | 89 | | | 101 | 184 | | | 195 | 278 |
| 282 | | | 5 | 88 | | | 100 | 183 | | | 194 | 277 |
| 283 | | | 4 | 87 | | | 99 | 182 | | | 193 | 276 |
| 284 | | | 3 | 86 | | | 98 | 181 | | | 192 | 275 |
| 285 | | | 2 | 85 | | | 97 | 180 | | | 191 | 274 |

The number of variations that are operable to adequately expose the photosensitive material are legion. Each variation provides its own unique tradeoffs between modulator size and exposure accuracy, process speed, and exposure algorithm.

Although each embodiment described above selected exposure periods which were an integer multiple of the minimum exposure time, non-integer multiples may also be used. Additionally, the exposure of each color including the duration and number of exposures and number of exposure periods may be different from the exposure of another color. Thus, the exposure of each color may be tuned to complement the characteristics of a particular light source or photosensitive material such as photographic paper. Not only may the exposure periods used for a particular color be different from the exposure periods used for another color, the exposure periods used for a color may change over time. This allows the photographic printer to maintain high-quality output while using an aging light source.

No particular ordering of the exposure periods is required. Several exposure period patterns may simplify the design of the printer hardware, or improve image quality, depending on the printer system and type of modulated light source used.

Perhaps the simplest exposure pattern occurs when the exposure controller 1302 always uses the first row of the modulated light source 1206 to create exposure period one of Table 1, the second through sixth rows to create exposure period two, the seventh through tenth rows to create exposure period three, and the eleventh through eighty-fourth rows to create exposure period four. Another exposure pattern provides the exposures in reverse order, from exposure period four through exposure period one. Yet another exposure pattern provides the exposure opportunities in a random, or pseudo-random, order. The ordering of the exposure opportunities can be periodically changed to further limit the creation of image artifacts. One of the most objectionable being banding, where bars of brighter or darker patterns or colored rainbow effects appear across the process direction. Since the exposures are a continuous process, however, it is difficult to change the order of the exposures while ensuring each row of the photosensitive material will receive sufficient exposure opportunities.

Under certain critical conditions, typically in the production of mid-range colors where the eye is most sensitive to very small optical density changes, banding can be detected at very subtle levels. It is possible to improve the lookup table algorithms that control the order of the exposures to reduce the threshold of this image quality artifact in the following manner.

Each image pixel in the photofinishing algorithm is created by integrating the light reflected from many DMD mirrors. As the photosensitive material, for example silver halide paper, moves beneath the DMD, each pixel has hundreds of opportunities to receive exposure, once for each mirror it passes beneath. During its travel, it will pass through three light phases: red, green, and blue (RGB). Since this a continuous process, not all pixels enter the image area beneath the DMD at the beginning of one of the color phases. The colorwheel, or other color filter device such as a color drum, spins at a rate locked to the exposure sync so that one rotations of the wheel is equal to the time it takes one pixel to traverse the image area. Some pixels enter the image area while the wheel is in the middle of one of its color sections. Therefore, some pixels get a portion of their exposure for that color at the beginning of the active mirror area, and the rest at the end. Due to this separation in accumulation, a speed mismatch between the photosensitive material and the exposure syncs can result in pixel misregistration, causing image banding.

For example, suppose an algorithm uses only one pulse length, or exposure level, and an image area of 300 pixels, 100 for each color (RGB). Each step through the 300 mirror rows, from the exposure region of one row to the exposure region of the next row, is called a phase. To form a light gray image, each color will only use a portion of its hundred mirrors, perhaps 20 exposure periods during that color, for a total of 60, to make up the light gray. Typically, the pixels would receive all of its red light in the first twenty red exposure opportunities. For the other eighty red exposure opportunities, all the mirrors will be off. This then repeats for green and blue.

All three-hundred rows of the pixels on the DMD are in the same phase. If the first image pixel (P1) enters the image area at the start of the red phase (Phase 1), it will accumulate all of its red light in the first twenty phases (Red 1–20). It would receive light in the order Phase 1, 2, 3, 4, and so on to Phase 300. The second pixel (P2), however, enters during Phase 2. It will receive light through Phase 20, but it still needs one more exposure. When this pixels gets to the last mirror of the DMD image area, the color wheel is back to Phase 1, and the last exposure is integrated. Pixel three (P3) enters at Phase 3. It will get seventeen exposures at the beginning of the image area, and two at the end. This continues on until the entire image is exposed (1920 pixels). This separation of exposures happens for each color, as some pixels enter during the green and blue phases.

A small difference in speed between the exposure sync and the photosensitive material speed has little effect on pixels that receive all their energy from consecutive mirrors, as the distance is very small. But it will greatly affect the registration of pixels that accumulate their light on opposite sides of the image area. If the photosensitive material is moving to slowly, some pixels will receive too much light, resulting in dark bands across the image (assuming a negative exposure material such a photographic paper is used). If the photosensitive material is too fast, the pixel on the photosensitive material leaves the image area before receiving its last exposure, resulting in light bands. To help visualize this, image a conveyer belt of buckets passing beneath a dump truck full of sand. As the buckets pass beneath the dump truck, its bed lifts periodically to dump sand in the buckets. A conveyer belt moving too fast means some buckets don't get full of sand because they pass beyond the dump truck's bed before it dumps the required number of times. Too slow and they are under the truck too long, resulting in too much sand.

There is a direct correspondence between the width of the bands and the number of mirror rows used for that gray level. In the example above, the bands would be twenty pixels wide. These bands are very visible in light, continuous colors. This is because if the pixel loses one exposure out of twenty, it will be 5% lighter. If a saturated color were being printed with one hundred mirrors, losing one exposure would result in a 1% difference. Since these bands are twenty pixels wide, they are very noticeable.

To mitigate this problem, the phases utilized in each color to generate the exposure pulses are now spread throughout each color phase. If only twenty of the one hundred mirrors are used for each color phase, every fifth mirror is used instead of the first twenty. Speed is still a concern, and banding can still occur. However, since the mirror pixels are no longer in groups right next to each other, the banding is reduced to the smallest width possible, usually only one pixel wide. This makes it almost unnoticeable, and is a marked improvement over banding which results from using continuous mirror rows.

Some modulator arrays may place constraints on the ordering of the exposure opportunities. As discussed above, some DMD arrays rely on a small address voltage to slightly rotate a mirror toward a chosen address electrode, and use a large bias voltage applied to the mirrors to collapse the mirrors toward the chosen address electrode. The superstructure design of many DMD arrays makes it advantageous to electrically connect all of the mirrors in the array. If all of the mirrors in the array are electrically connected, traditional mirror reset techniques require all of the mirrors to reset simultaneously—thus, all of the mirrors in the array must provide the same exposure duration or period to a very high degree of precision.

Requiring all of the elements in the modulated light source to provide the same exposure period requires the modulated light source to sequence through each of the exposure periods. For example, all elements of the modulated light source may create exposure period one, then five separate period two exposures, then four separate period three exposures, and finally seventy-four period four exposures. This pattern is repeated for each of the three colors. According to this embodiment, the sequence in which each row receives the exposure periods depends on when in the exposure sequence the row enters the exposure region 1200.

For example, while a first row of an image receives the exposure periods in order, the fifteenth row of the image first would receive seventy period four exposures of a first color, then exposures for each of the other two colors, and finally one period one exposure, five period two exposures, four period three exposures, and four additional period four exposures, in order, for the first color. Each of the first ninety-five rows has a unique exposure sequence, and the exposure sequence for each row repeats every ninety-five rows--but with the next color filter.

Another exposure pattern which potentially improves image quality requires the display to attempt to use primarily the center rows of the modulator array to expose the image. For the reasons detailed above in the discussion of FIG. 9, using only the center of the modulator array improves the alignment of the image projected on the photosensitive material. A variation of this exposure pattern attempts to produce the exposure using modulator arrays in the same portion of the modulator array. These exposure pattern schemes, however, become quite complex when using modulator arrays in which all rows must provide the same exposure period.

Exposure of the photosensitive material is varied by modulating the total exposure energy reaching a given region of the photosensitive material. As discussed above, some embodiments modulate exposure energy by controlling the duration of a constant-energy light source. Another method of controlling the exposure energy is to vary the intensity of the light source.

The ability to control the output level of the light source provides additional control over the duration of the exposure period. Assuming the photosensitive material is moving eight inches per second while being exposed at 320 lines per inch, only about 390 $\mu$S is available to expose each line. Assuming the exposure period is limited to 25% of the line period and a minimum device cycle time of 17 $\mu$S, the maximum exposure period is only 5.74 times longer than the shortest possible exposure period. Therefore, in order to achieve 12 bits of color resolution, or 4096 levels of gray, 714 exposure periods are necessary for each color merely to produce the maximal exposure level—additional shorter exposure periods are necessary to provide the small exposure increments necessary to represent 4096 exposure levels.

As discussed above, 714 exposure periods per color is far too many for most modulator arrays to produce, and too difficult to bring into focus without resort to expensive optical systems. The system described above, which uses only 84 exposure opportunities per color, strikes a balance between modulator size and the ability to produce many shades of gray by sacrificing the accuracy of the very low exposure levels. Specifically, the system described above is capable of reproducing exposure levels in multiple of 10, 11, 18, and 56 LSBs only. This limitation primarily effects pixels having a relatively low exposure level.

Modulating the intensity of the light, in addition to or in place of modulating the duration of the exposure, reduces the number of modulator rows necessary to provide accurate gray scale exposures. Some embodiments of the present invention allow the intensity of the light source to be varied on a pixel-by-pixel basis. For example, an LED array allows each LED in the array to output a different brightness level. Other embodiments allow the intensity of light striking the photosensitive material to be controlled, but not on a pixel-by-pixel basis. Still other embodiments use light sources, such are arc lamps, which are difficult to control in terms of intensity output.

An alternative to controlling the output power of the light source is to vary the intensity of the light beam produced by the light source. One way to vary the intensity of the light beam is to use one or more neutral-density filters in the light path.

Figure 32:
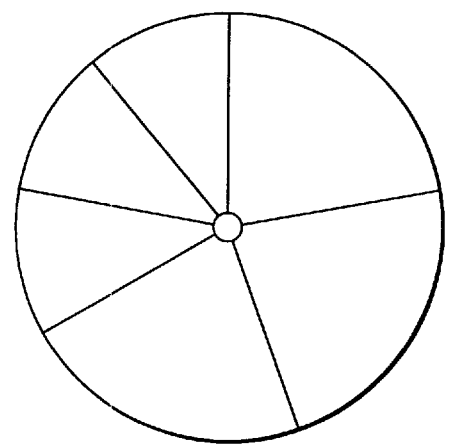
FIG. 32 is a plan view of a six-segment color wheel having three large segments, each for providing a unique color light, and three smaller segments for providing the same three unique colors at a reduced intensity.

FIG. 32 shows a plan view of a six-segment color wheel 3200. The six-segment color wheel comprises three large segments, each for providing a unique color light, and three smaller segments for providing the same three unique colors but at a reduced intensity. As with the three-segment color wheel systems described above, many embodiments of exposure systems are possible depending on the number of modulator rows available and the number and duration of exposure opportunities.

Table 3 lists the number, duration and intensity of exposure opportunities provided by one embodiment of a photographic printer utilizing a six-segment color wheel. The embodiment detailed in Table 3 makes use of two exposure durations and two exposure intensities to provide 4155 unique exposure levels including a zero exposure level.

TABLE 3

| Intensity | Duration | Effective Intensity | Effective Duration | Effective Exposure | Exposure Opportunities | Total Exposure |
|---|---|---|---|---|---|---|
| Low | Low | 1 | 1 | 1 | 4 | 4 |
| Low | High | 1 | 5 | 5 | 5 | 25 |
| High | Low | 25 | 1 | 25 | 5 | 125 |
| High | High | 25 | 5 | 125 | 32 | 4000 |
| Total | | | | | 46 | 4154 |

Implementation of the exposure scheme of Table 3 requires a 204 row modulator array. Forty-six modulator rows are used to expose each color, and sixty-six rows are used for six eleven-row spoke periods. Although only 204 modulator rows are required, compared to the 285 modulator rows required for the 3-segment color wheel system described above, the 6-segment system described by Table 3 is capable of accurately producing each of the 4155 exposure levels.

The six-segment system of Table 3 exposes the photosensitive material in the same manner as the three-segment system of Tables 1 and 2. The exposure pattern repeats every 204 image rows, and two color wheel revolutions are required to completely expose a 204 row portion of the photosensitive material.

Figure 33:
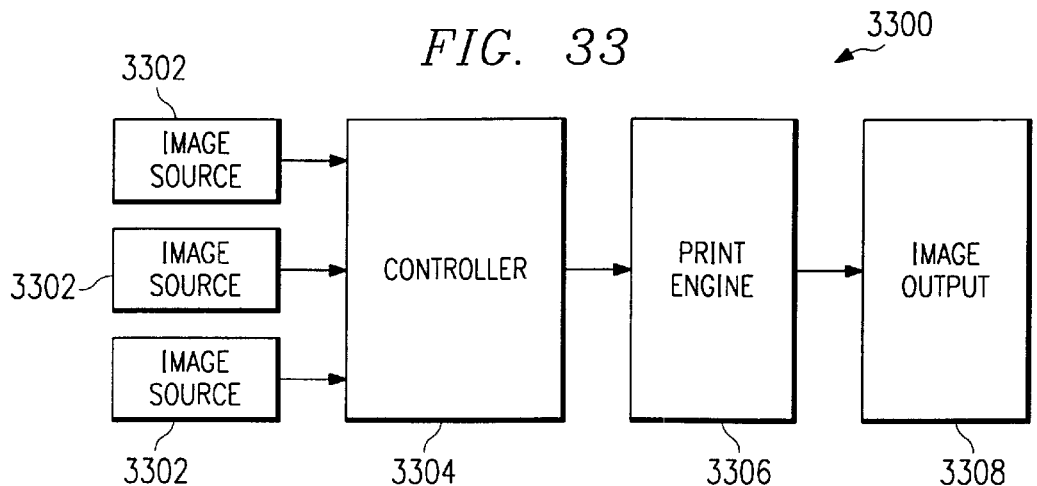
FIG. 33 is a block diagram of an image printer according to one embodiment of the disclosed invention.

FIG. 33 is a block diagram of an image printer 3300 according to one embodiment of the disclosed invention. In FIG. 33, one or more image sources 3302 provide input data to a controller 3304. Controller 3304 often includes large amounts of memory used to temporarily store the image information until it is transferred to the print engine 3306. The print engine 3306 receives image data from the controller 3304 and prints the images represented by the data. Block 3308 is the image output from the printer 3300.

The multiple image sources 3302 shown in FIG. 33 may be used when a single input source does not have sufficient throughput fully to utilize the capacity of the print engine. For example, if the image sources are scanners used to digitize images from conventional 35 mm negatives, several scanners may be used each to scan negative from a different customer's film. When all the negatives from a roll have been scanned and processed, the controller transfers the image data to the print engine 3306. In this application the image output block 3308 may represent sorting and stuffing machinery necessary to individually package and label each customer's output.

Figure 34:
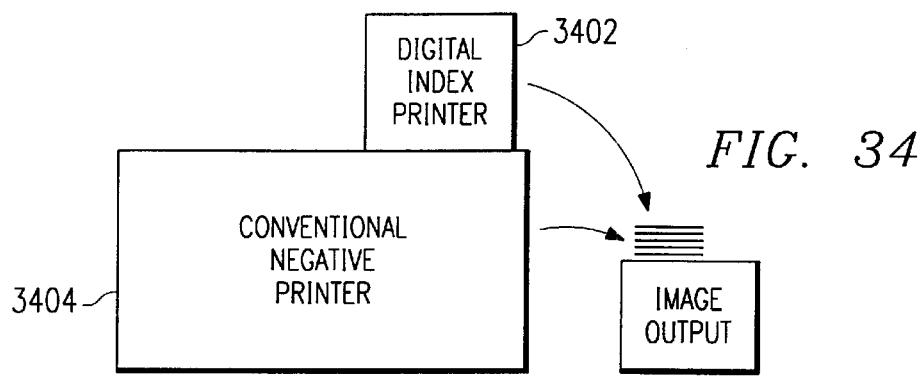
FIG. 34 is a block diagram of a photofinishing printer combining a conventional negative printer with a digital image printer according to one embodiment of the present invention.
Figure 35:
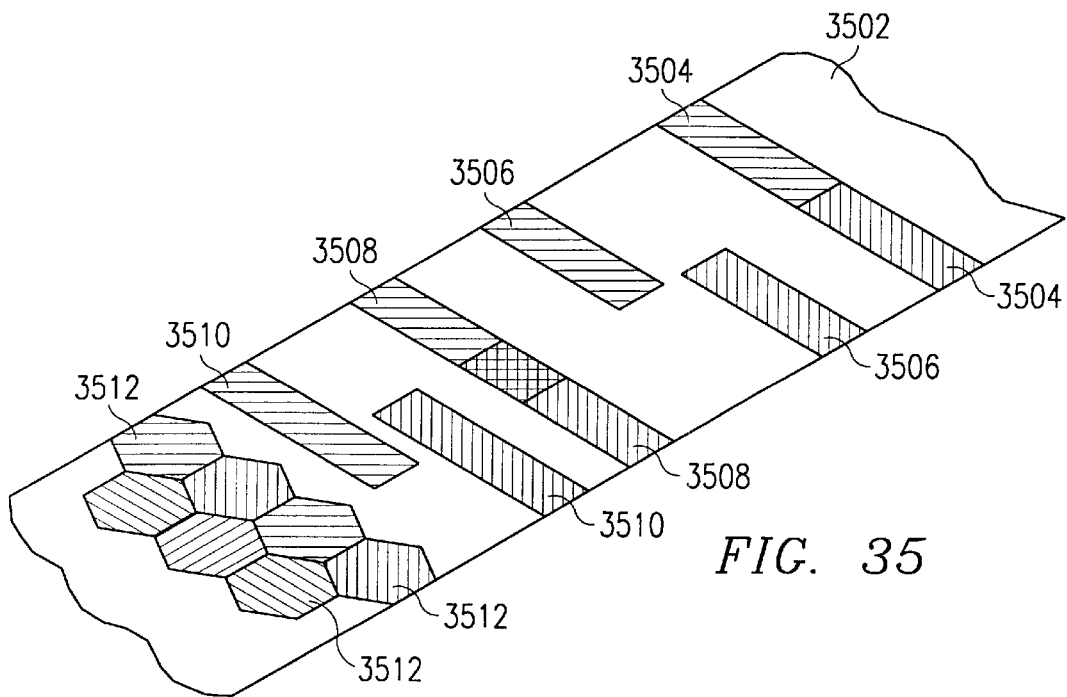
FIG. 35 is a plan view showing the exposure regions of multiple modulated light sources cooperatively forming a single image on a photosensitive substrate.

FIG. 34 shows another embodiment of a printer utilizing the concepts taught herein. In FIG. 34 a digital index printer 3402 is shown combined with a conventional negative printer 3304. The digital index printer 3402 receives image data representing several images being printed by the conventional negative printer 3404 and prints an image representing a plurality of the images printed by the conventional negative printer as a single image. These sub-images, each representing an image from one of the photographic negatives, are typically called thumbnails. The operation of the digital index printer 3402 and the conventional negative printer 3404 are coordinated such that the index print output of the digital index printer 3402 and the associated prints from the conventional negative printer 3404 are combined to be returned to the customer.

Although various aspects of the invention described herein have been disclosed in terms of an imaging system that uses a single modulated light source array to span the entire width of an image, it should be understood that alternate embodiments allow the use of multiple modulated light source arrays to cooperatively image a photosensitive medium. FIG. 36 shows multiple exposure regions on a photosensitive medium 3602. Exposure regions 3604 abut. Exposure regions 3606 also abut, but are shifted relative to each other in the process direction. Image data used to create exposure regions 3606 is time delayed so that the images formed are properly aligned in the process direction. Exposure regions 3608 are overlapped. Exposure regions 3610 arc overlapped and shifted in the process direction.

Various methods of ameliorating the effects of misalignment between multiple modulation sources by overlapping the exposure regions and jointly contributing to the exposure of pixels in the overlapped regions are taught in U.S. Pat. No. 5,630,027, issued May 13, 1997 and entitled "Method and Apparatus for Compensating Horizontal and Vertical Alignment Errors in Display Systems," U.S. Pat. No. 5,757, 411 issued May 26, 1998 and entitled "Method and Apparatus for Ameliorating the Effects of Misalignment Between Two or More Array of Imaging Elements," and U.S. Pat. No. 5,825,400 Oct. 20, 1998 and entitled "Method and Apparatus for Ameliorating the Effects of Misalignment Between Two or More Array of Imaging Elements," each of which is incorporated by reference herein.

Exposure regions 3612 are produced by multiple modulated light sources and create a tiled output. Tiled exposures allow the use of relatively small modulated light sources, or the creation of very large images. Although not shown in FIG. 36, tiled exposure regions may overlap and may be shifted in the process direction.

Thus, although there has been disclosed to this point a particular embodiment for an image printer and modulation technique particularly well suited for photofinishing applications, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of exposing a full-color pixelated image on a photosensitive medium, the method comprising the steps of:

providing an exposure region;

providing a photosensitive medium comprising an array of rows of pixel locations, said photosensitive medium moving through said exposure region such that said photosensitive medium advances one row of said pixel locations at a time, the advance of said photosensitive medium by one row of pixel locations being defined as a row period;

providing a modulated light source to selectively provide a beam of light to an array of individually modulated regions in said exposure region, said individually modulated regions in said exposure region corresponding to said pixel locations in said exposure region once each exposure opportunity with the number of rows of pixel locations operable in said modulated light source determining a maximum number of exposure opportunities and with each said row defining an exposure opportunity;

controlling said modulated light source based on image data provided to said modulated light source, said image data comprising optical density data for each pixel in an image to be formed on said photosensitive medium for each of at least three primary colors, said controlling step comprising the step of: selectively exposing said photosensitive medium at a number of said exposure opportunities, said selective exposure performed for a period no greater than 50% of the row time, the duration of at least two of said exposure periods having a non-binary relationship.

2. The method of claim 1, said step of providing a modulated light source comprises providing a modulated light source having a periodically varying color.

3. The method of claim 1, said controlling step varying the exposure sequence from one row of pixel locations to the next.

4. The method of claim 1, said step of providing a photosensitive medium comprising the step of providing a photographic paper.

5. The method of claim 1, said step of providing a modulated light source comprising the steps of:

providing a light source for projecting a beam of light along a path;

providing a color filter device on said light path for filtering said beam of light; and providing a spatial light modulator on said light path.

6. The method of claim 5, further comprising the step of providing a neutral density filter function on said light path.

7. The method of claim 1, said step of providing a modulated light source comprising the steps of:

providing at least one solid state light source for projecting a beam of light along a path.

8. A method of exposing a full-color pixelated image on a photosensitive medium, the method comprising the steps of:

providing an exposure region;

providing a photosensitive medium comprising an array of rows of pixel locations, said photosensitive medium moving through said exposure region such that said photosensitive medium advances one row of said pixel locations at a time, the advance of said photosensitive medium by one row of pixel locations being defined as a row period;

providing a modulated light source, said modulated light source operable to selectively provide a beam of light to an array of individually modulated regions in said exposure region, said individually modulated regions in said exposure region corresponding to said pixel locations in said exposure region once each exposure opportunity, wherein the number of rows of pixel locations operable in said modulated light source determines a maximum number of exposure opportunities with each said row defining an exposure opportunity;

controlling said modulated light source based on image data provided to said modulated light source, said image data comprising optical density data for each pixel in an image to be formed on said photosensitive medium for each of at least three primary colors, said controlling step comprising selectively exposing said photosensitive medium at a number of exposure opportunities, said selective exposure performed for a period no greater than 50% of the row time, the duration of at least two of said exposure periods having a non-binary relationship;

said controlling step providing a maximum exposure period no greater than 25% of the row period.

9. A method of exposing a full-color pixelated image on a photosensitive medium, the method comprising the steps of:

providing an exposure region;

providing a photosensitive medium comprising an array of rows of pixel locations, said photosensitive medium moving through said exposure region such that said photosensitive medium advances one row of said pixel locations at a time, the advance of said photosensitive medium by one row of pixel locations being defined as a row period;

providing a modulated light source, said modulated light source operable to selectively provide a beam of light to an array of individually modulated regions in said exposure region, said individually modulated regions in said exposure region corresponding to said pixel locations in said exposure region once each exposure opportunity, wherein the number of rows of pixel locations operable in said modulated light source determines a maximum number of exposure opportunities with each said row defining an exposure opportunity;

controlling said modulated light source based on image data provided to said modulated light source, said image data comprising optical density data for each pixel in an image to be formed on said photosensitive medium for each of at least three primary colors, said controlling step comprising selectively exposing said photosensitive medium at a number of exposure opportunities, said selective exposure performed for a period no greater than 50% of the row time, the duration of at least two of said exposure periods having a non-binary relationship;

said controlling step providing a minimum exposure period of at least ten LSB periods.

10. A method of exposing a full-color pixelated image on a photosensitive medium, the method comprising the steps of:

providing an exposure region;

providing a photosensitive medium comprising an array of rows of pixel locations, said photosensitive medium moving through said exposure region such that said photosensitive medium advances one row of said pixel locations at a time, the advance of said photosensitive medium by one row of pixel locations being defined as a row period;

providing a modulated light source, said modulated light source operable to selectively provide a beam of light to an array of individually modulated regions in said exposure region, said individually modulated regions in said exposure region corresponding to said pixel locations in said exposure region once each exposure opportunity, wherein the number of rows of pixel locations operable in said modulated light source determines a maximum number of exposure opportunities with each said row defining an exposure opportunity;

controlling said modulated light source based on image data provided to said modulated light source, said image data comprising optical density data for each pixel in an image to be formed on said photosensitive medium for each of at least three primary colors, said controlling step comprising selectively exposing said photosensitive medium at a number of exposure opportunities, said selective exposure performed for a period no greater than 50% of the row time, the duration of at least two of said exposure periods having a non-binary relationship;

said controlling step providing at least 84 exposure opportunities for each of three colors said 84 exposure opportunities comprising one exposure opportunity having a duration of ten LSBs, five exposure opportunities having a duration of eleven LSBs, four exposure opportunities having a duration of eighteen LSBs, and seventy-four exposure opportunities having an exposure period of 56 LSBs.

11. A digital photograph printer, said photograph printer comprising:

a transport mechanism for advancing a photosensitive medium through an exposure region, said photosensitive medium comprising an array of pixel locations, said photosensitive medium moving through said exposure region such that said photosensitive medium advances one row of said pixel locations each row period;

a modulated light source operable to selectively provide a beam of light to an array of individually modulated regions in said exposure region, wherein as said photosensitive medium moves through said exposure region said individually modulated regions in said exposure region correspond to said pixel locations in said exposure region once each exposure opportunity, where in the number of rows operable in said modulated light source determines a maximum number of exposure opportunities;

an exposure controller, said exposure controller operable to control said modulated light source based on image data provided to said modulated light source, said image data comprising optical density data for each pixel in an image to be formed on said photosensitive medium for each of at least three primary colors, said controller selectively exposing said photosensitive medium at a number of exposure opportunities for a period no greater than 50% of the row time, the duration of at least two of said exposure periods having a non-binary relationship;

said controller providing a maximum exposure period no greater than 25% of the row period.

12. A digital photograph printer, said photograph printer comprising:

a transport mechanism for advancing a photosensitive medium through an exposure region, said photosensitive medium comprising an array of pixel locations, said photosensitive medium moving through said exposure region such that said photosensitive medium advances one row of said pixel locations each row period;

a modulated light source operable to selectively provide a beam of light to an array of individually modulated regions in said exposure region, wherein as said photosensitive medium moves through said exposure region said individually modulated regions in said exposure region correspond to said pixel locations in said exposure region once each exposure opportunity, where in the number of rows operable in said modulated light source determines a maximum number of exposure opportunities;

an exposure controller, said exposure controller operable to control said modulated light source based on image data provided to said modulated light source, said image data comprising optical density data for each pixel in an image to be formed on said photosensitive medium for each of at least three primary colors, said controller selectively exposing said photosensitive medium at a number of exposure opportunities for a period no greater than 50% of the row time, the duration of at least two of said exposure periods having a non-binary relationship;

said controller providing a minimum exposure period of at least ten LSB periods.

13. A digital photograph printer, said photograph printer comprising:

a transport mechanism for advancing a photosensitive medium through an exposure region, said photosensitive medium comprising an array of pixel locations, said photosensitive medium moving through said exposure region such that said photosensitive medium advances one row of said pixel locations each row period;

a modulated light source operable to selectively provide a beam of light to an array of individually modulated regions in said exposure region, wherein as said photosensitive medium moves through said exposure region said individually modulated regions in said exposure region correspond to said pixel locations in said exposure region once each exposure opportunity, where in the number of rows operable in said modulated light source determines a maximum number of exposure opportunities;

an exposure controller, said exposure controller operable to control said modulated light source based on image data provided to said modulated light source, said image data comprising optical density data for each pixel in an image to be formed on said photosensitive medium for each of at least three primary colors, said controller selectively exposing said photosensitive medium at a number of exposure opportunities for a period no greater than 50% of the row time, the duration of at least two of said exposure periods having a non-binary relationship;

said controller providing at least eighty-four exposure opportunities for each of three colors, said eighty-four exposure opportunities comprising one exposure opportunity having a duration of ten LSBs, five exposure opportunities having a duration of eleven LSBs, four exposure opportunities having a duration of eighteen LSBs, and seventy-four exposure opportunities having an exposure period of 56 LSBs.

14. A digital photograph printer, said photograph printer comprising:

a transport mechanism for advancing a photosensitive medium through an exposure region having an array of individually modulated regions, said photosensitive medium comprising an array of rows of pixel locations, said transport mechanism moving said photosensitive medium through said exposure region such that said photosensitive medium advances one row of said pixel locations each row period, a row period being defined as the advance of said photosensitive medium by one row of pixel locations;

a modulated light source operable to selectively provide a beam of light to said array of individually modulated regions in said exposure region, said photosensitive medium moving under control of said transport mechanism through said exposure region so that said individually modulated regions in said exposure region correspond to said pixel locations in said exposure region once each exposure opportunity and the number of rows operable in said modulated light source determine a maximum number of exposure opportunities;

an exposure controller controlling said modulated light source in response to image data provided to said modulated light source, said image data comprising optical density data for each pixel in an image to be formed on said photosensitive medium for each of at least three primary colors, said controller selectively exposing said photosensitive medium at a number of exposure opportunities for a period no greater than 50% of the row time, the duration of at least two of said exposure periods having a non-binary relationship.

15. The digital photograph printer of claim 14, said modulated light source providing a modulated light source having a periodically varying color.

16. The digital photograph printer of claim 14, said controller varying the exposure sequence from one row of pixel locations to the next.

17. The digital photograph printer of claim 14, said photosensitive medium comprising a photographic paper.

18. The digital photograph printer of claim 14, said modulated light source comprising:

a light source for projecting a beam of light along a path;

a color filter device on said light path for filtering said beam of light; and a spatial light modulator on said light path.

19. The digital photograph printer of claim 18, said modulated light source further comprising a neutral density filter function on said light path.

20. The digital photograph printer of claim 14, said modulated light source comprising at least one solid state light source for projecting a beam of light along a path.

21. The digital photograph printer of claim 14, further comprising a negative printer, said digital photograph printer printing index prints of the photographs formed by said negative printer.

* * * * *